United States Patent
Park et al.

(10) Patent No.: US 12,096,149 B2
(45) Date of Patent: Sep. 17, 2024

(54) COMPARISON CIRCUIT, AND ANALOG-TO-DIGITAL CONVERTER AND IMAGE SENSOR INCLUDING THE SAME

(71) Applicant: Samsung Electronics Co., Ltd., Suwon-si (KR)

(72) Inventors: Keunyeol Park, Seoul (KR); Sooyoun Kim, Seoul (KR)

(73) Assignees: Samsung Electronics Co., Ltd., Gyeonggi-do (KR); Dongguk University Industry-Academic Cooperation Foundation, Seoul (KR)

( * ) Notice: Subject to any disclaimer, the term of this patent is extended or adjusted under 35 U.S.C. 154(b) by 84 days.

(21) Appl. No.: 18/150,619

(22) Filed: Jan. 5, 2023

(65) Prior Publication Data
US 2023/0254605 A1    Aug. 10, 2023

(30) Foreign Application Priority Data

Feb. 10, 2022    (KR) .................. 10-2022-0017772
May 27, 2022    (KR) .................. 10-2022-0065320

(51) Int. Cl.
*H04N 25/772*    (2023.01)
*H04N 25/709*    (2023.01)

(52) U.S. Cl.
CPC ......... *H04N 25/772* (2023.01); *H04N 25/709* (2023.01)

(58) Field of Classification Search
CPC .. H04N 25/772; H04N 25/709; H04N 25/616; H04N 25/78
See application file for complete search history.

(56) References Cited

U.S. PATENT DOCUMENTS

| 7,486,115 | B2 | 2/2009 | Lee |
| 8,976,052 | B2 | 3/2015 | Kim et al. |
| 9,312,873 | B2 | 4/2016 | Furuta et al. |
| 9,571,113 | B2 | 2/2017 | Ikebe |
| 9,806,721 | B2 | 10/2017 | Kim et al. |
| 10,091,450 | B2 | 10/2018 | Hwang |

(Continued)

FOREIGN PATENT DOCUMENTS

KR    10-0918755 B1    9/2009

OTHER PUBLICATIONS

K. Shiraishi et al., '6.7 A 1.2e- Temporal Noise 3D-Stacked CMOS Image Sensor with Comparator-Based Multiple-Sampling PGA' *ISSCC*, 2016, SESSION 6, Image Sensors, 6.7, pp. 122-124.

*Primary Examiner* — Nicholas G Giles
(74) *Attorney, Agent, or Firm* — Harness, Dickey & Pierce, P.L.C.

(57) ABSTRACT

Disclosed is an analog-to-digital converter including a comparison circuit and a counter circuit. The comparison circuit outputs a comparison result signal based on a pixel signal and a ramp signal and outputs a zero-crossing prediction signal, is the comparison circuit being configured to transition the zero-crossing prediction signal before a zero-crossing time point at which a voltage level of the pixel signal becomes identical to a voltage level of the ramp signal and during a time interval during which the voltage level of the ramp signal is reduced. The counter circuit outputs a low-order bit digital code based on the zero-crossing prediction signal and stops the output of the low-order bit digital code based on the comparison result signal.

20 Claims, 19 Drawing Sheets

(56) References Cited

U.S. PATENT DOCUMENTS

| | | | |
|---|---|---|---|
| 10,097,196 B2 | 10/2018 | Sato | |
| 10,103,184 B2 | 10/2018 | Hwang | |
| 10,326,955 B1 | 6/2019 | Lin et al. | |
| 10,567,685 B2 | 2/2020 | Sato et al. | |
| 2015/0194973 A1* | 7/2015 | Furuta | H04N 25/767 |
| | | | 341/122 |

* cited by examiner

| | Auto-Zero | Offset | A/D Conversion |
|---|---|---|---|
| Cgain | HIGH (Switch On) | HIGH (Switch On) | LOW (Switch Off) |

COMPARISON CIRCUIT, AND ANALOG-TO-DIGITAL CONVERTER AND IMAGE SENSOR INCLUDING THE SAME

CROSS-REFERENCE TO RELATED APPLICATIONS

This application claims priority under 35 U.S.C. § 119 to Korean Patent Application No. 10-2022-0017772 filed on Feb. 10, 2022 and Korean Patent Application No. 10-2022-0065320 filed on May 27, 2022, in the Korean Intellectual Property Office, the disclosures of which are incorporated by reference herein in their entireties.

BACKGROUND

Example embodiments of the present disclosure described herein relate to a semiconductor device, and more particularly, relate to a comparison circuit, an analog-to-digital converter (ADC) including the comparison circuit, and an image sensor including the same.

An image sensor generates digital image data by detecting light incident through a camera lens and performing photoelectric conversion. A column-parallel ADC structure in which an ADC is arranged for each column of a pixel array is used to generate high-resolution digital image data. The ADC includes a comparison circuit and a counter circuit. The comparison circuit compares a pixel signal with a ramp signal, and the counter circuit generates a digital code corresponding to a level of the pixel signal by using a result of comparing the pixel signal and the ramp signal. In a process of generating the digital code, the comparison circuit and counter circuit generally continuously operate from a point in time, at which a voltage level of the ramp signal starts to be changed with a constant slope, to a point in time when a voltage level of an output signal of the comparison circuit increases to be greater than or equal to a predetermined (or alternatively, desired) voltage level. In this process, the comparison circuit continuously consumes static power, and the counter circuit continuously consumes dynamic power, thereby constantly using power and reducing the power efficiency of the image sensor.

SUMMARY

Example embodiments of the present disclosure provide a comparison circuit that improves power efficiency of an image sensor and improves noise performance.

Example embodiments of the present disclosure provide an ADC including the comparison circuit and an image sensor including the same.

According to an example embodiment, an analog-to-digital converter (ADC) includes a comparison circuit and a counter circuit. The comparison circuit outputs a comparison result signal based on a pixel signal and a ramp signal and outputs a zero-crossing prediction signal, the comparison circuit being configured to transition the zero-crossing prediction signal before a zero-crossing time point at which a voltage level of the pixel signal becomes identical to a voltage level of the ramp signal and during a time interval during which the voltage level of the ramp signal is changed. The counter circuit outputs a low-order bit digital code based on the zero-crossing prediction signal and stops the output of the low-order bit digital code based on the comparison result signal.

According to an example embodiment, a comparison circuit includes a first sub-circuit, a second sub-circuit, and a zero-crossing prediction circuit. The first sub-circuit outputs a first output signal through a first node by comparing a pixel signal with a ramp signal. The second sub-circuit outputs a second output signal as a comparison result signal by amplifying the first output signal. The zero-crossing prediction circuit outputs a zero-crossing prediction signal based on the first output signal, the zero-crossing prediction circuit is configured to transition the zero-crossing prediction signal before a zero-crossing time point at which a voltage level of the pixel signal becomes identical to a voltage level of the ramp signal during a time interval during which the voltage level of the ramp signal is changed.

According to an example embodiment, an image sensor includes a pixel array, a ramp signal generator, a comparison circuit, and a counter circuit. The pixel array outputs a pixel signal. The ramp signal generator outputs a ramp signal. The comparison circuit outputs a comparison result signal based on a pixel signal and a ramp signal and outputs a zero-crossing prediction signal, the comparison circuit is configured to transition the zero-crossing prediction signal before a zero-crossing time point at which a voltage level of the pixel signal becomes identical to a voltage level of the ramp signal, during a time interval during which the voltage level of the ramp signal is changed. The counter circuit outputs a low-order bit digital code based on the zero-crossing prediction signal and stops the output of the low-order bit digital code based on the comparison result signal. The comparison circuit includes a first amplification circuit and a second amplification circuit. The first amplification circuit has a first voltage gain and to generate the comparison result signal. The second amplification circuit connected to a first node included in the first amplification circuit and has a second voltage gain lower than the first voltage gain and to generate the zero-crossing prediction signal.

BRIEF DESCRIPTION OF THE FIGURES

The above and other objects and features of the present disclosure will become apparent by describing in detail some example embodiments thereof with reference to the accompanying drawings.

DETAILED DESCRIPTION

Hereinafter, some example embodiments of the present disclosure will be described in detail and clearly to such an extent that an ordinary one in the art easily implements the present disclosure.

Figure 1:
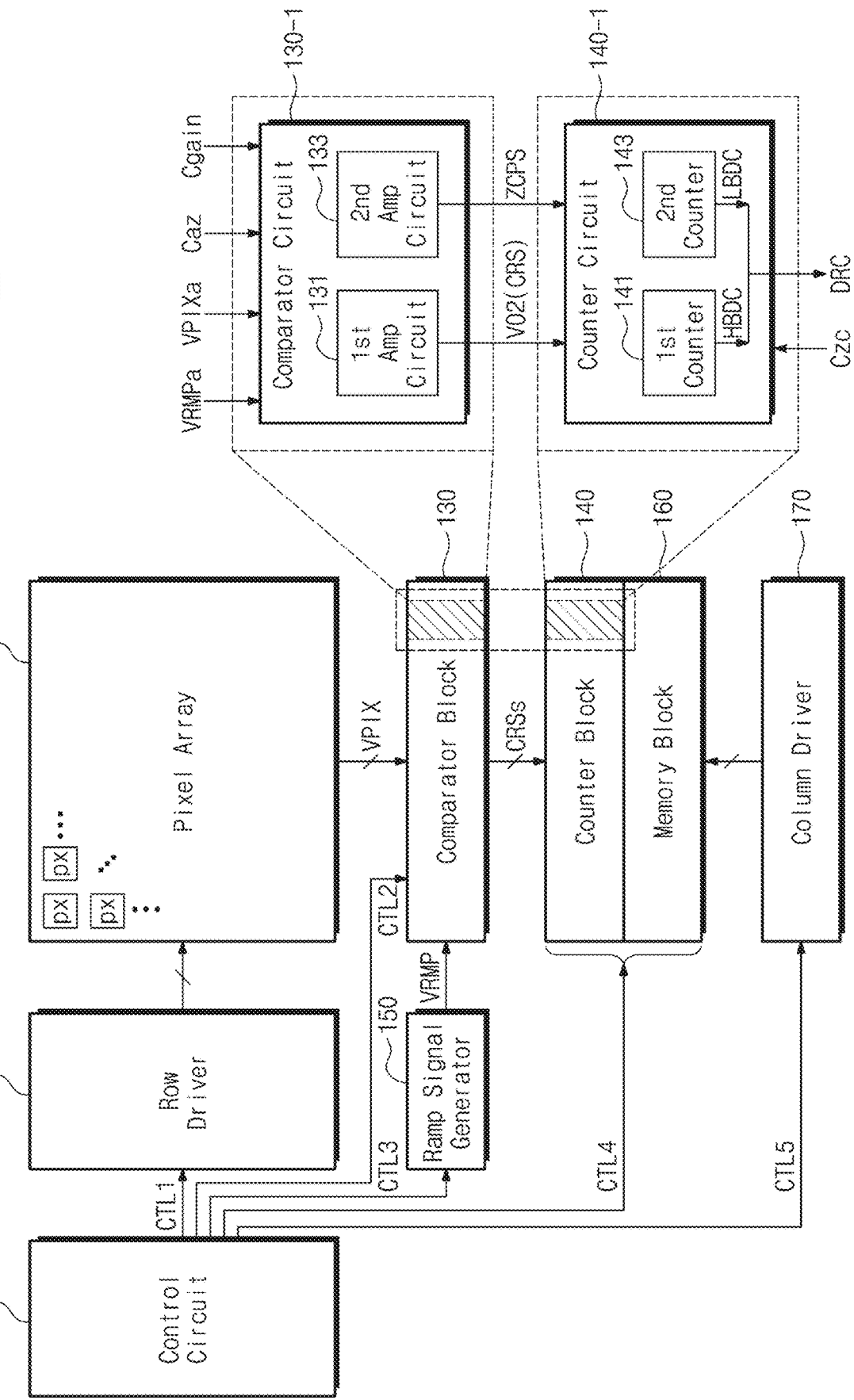
FIG. 1 is a block diagram illustrating an image sensor including a comparison circuit and an ADC, according to some example embodiments of the present disclosure.

FIG. 1 is a block diagram illustrating an image sensor including a comparison circuit and an ADC, according to some example embodiments of the present disclosure.

Referring to FIG. 1, an image sensor 10 may include a pixel array 110, a row driver 120, a comparator block 130, a counter block 140, a ramp signal generator 150, a memory block 160, a column driver 170 and a control circuit 180.

The pixel array 110 may include a plurality of pixels px. The plurality of pixels px may have a matrix shape and may be repeatedly arranged at specific intervals in row and column directions. Each of (or at least one of) the plurality of pixels px may be connected to one of a plurality of rows and one of a plurality of columns. The pixel array 110 may detect light incident through a camera lens by opening/closing a shutter, may generate photo charges by performing photoelectric conversion, and may output pixel signals VPIX based on the photo charges.

The ramp signal generator 150 may output a ramp signal VRMP having a voltage level changed in a predetermined (or alternatively, desired) scheme with respect to each of (or at least one of) a plurality of time intervals during which the image sensor 10 operates.

The comparator block 130 may output comparison result signals CRSs based on the pixel signals VPIX and the ramp signal VRMP. The counter block 140 may receive the comparison result signals CRSs from the comparator block 130, and output the digital codes DRCs based on the comparison result signals CRSs. The memory block 160 may temporarily store the digital codes DRCs. The digital codes DRCs may include digital values corresponding to photo charges generated by the pixel array 110.

The comparator block 130 may include a plurality of comparison circuits, and the counter block 140 may include a plurality of counter circuits. One of the plurality of comparison circuits (e.g., 130-1) and one of the plurality of counter circuits (e.g., 140-1) may constitute an ADC and may be arranged in each column of a pixel array to generate high-resolution digital image data. For example, the plurality of comparison circuits may correspond to the plurality of counter circuits, respectively, and the plurality of comparison circuits and the plurality of counter circuits may have a column-parallel ADC structure.

The comparison circuit 130-1 may output a comparison result signal VO2(CRS) based on a pixel signal VPIXa and a ramp signal VRMPa and may output a zero-crossing prediction signal ZCPS transitioned before a zero-crossing time point at which a voltage level of the pixel signal VPIXa is the same as a voltage level of the ramp signal VRMPa. As will be described later with reference to FIGS. 6, 12, and 14, the transitioning of the zero-crossing prediction signal ZCPS may mean that the voltage level of the zero-crossing prediction signal ZCPS, after being saturated with a ground voltage, goes out of saturation and then increases. To this end, the comparison circuit 130-1 may include a first amplification circuit 131 and a second amplification circuit 133. The first amplification circuit 131 may output the comparison result signal VO2(CRS), and the second amplification circuit 133 may output the zero-crossing prediction signal ZCPS. The first amplification circuit 131 may include sub-circuits, and the second amplification circuit 133 may be referred to as a 'zero-crossing prediction circuit'. The first amplification circuit 131 and the second amplification circuit 133 will be described later with reference to FIG. 4.

In some example embodiments, the second amplification circuit 133 may be connected to an internal node included in the first amplification circuit 131, and may output the zero-crossing prediction signal ZCPS based on a signal output through the internal node. For example, the internal node may be an output node of a first sub-circuit.

In some example embodiments, the first amplification circuit 131 may have a first voltage gain, and the second amplification circuit 133 may have a second voltage gain lower than the first voltage gain.

In some example embodiments, the second voltage gain may be adjusted to have a value that is set in advance for each of (or at least one of) a plurality of time intervals during which the image sensor 10 operates.

In some example embodiments, the second amplification circuit 133 may include one or more capacitors and one or more switches, which are used to control the second voltage gain. For example, the comparison circuit 130-1 may further receive control signals Caz and Cgain (e.g., a gain adjustment control signal) and may turn on/off the one or more switches during the one or more time intervals among time intervals based on the control signals Caz and Cgain. The control signals Caz and Cgain may be included in a control signal CTL2.

The counter circuit 140-1 may receive the comparison result signal VO2(CRS) and the zero-crossing prediction signal ZCPS from the comparison circuit 130-1, may output a low-order bit digital code LBDC based on the zero-crossing prediction signal ZCPS, and may stop the output of the low-order bit digital code LBDC based on the comparison result signal VO2(CRS). To this end, the counter circuit 140-1 may include a first counter 141 that outputs a high-order bit digital code HBDC, and a second counter 143 that outputs the low-order bit digital code LBDC. For example, the second counter 143 may not output the low-order bit digital code LBDC based on the zero-crossing prediction signal ZCPS until the zero-crossing time is almost reached. The counter circuit 140-1 will be described later with reference to FIGS. 15, 16, 17, and 18.

In some example embodiments, the counter circuit 140-1 may include digital logic gates for adjusting time points, at each of (or at least one of) which the first counter 141 and the second counter 143 are enabled, differently from one another. For example, the counter circuit 140-1 may further receive a control signal Czc and may differently adjust time points, at each of (or at least one of) which the first counter 141 and the second counter 143 are enabled during one or more of the plurality of time intervals, based on the comparison result signal VO2(CRS), the zero-crossing prediction signal ZCPS, and the control signal Czc. The control signal Czc may be included in a control signal CTL4.

The row driver 120 and the column driver 170 are connected to a plurality of rows and a plurality of columns of the pixel array 110, and may drive the plurality of pixels px by activating the plurality of rows and the plurality of columns.

The control circuit 180 may generally control the components 110, 120, 130, 130-1, 140, 140-1, 150, 160, and 170, which are included in the image sensor 10, by generating control signals CTL1, CTL2, CTL3, CTL4, and CTL5. For example, the control circuit 180 may control the pixel array 110, the row driver 120 and the column driver 170 based on the control signals CTL1 and CTL5, may control the comparator block 130 based on the control signal CTL2, may control the ramp signal generator 150 based on the control signal CTL3, and may control the counter block 140 and the memory block 160 based on the control signal CTL4.

The image sensor 10 may perform a correlated double sampling (CDS) operation by using the pixel array 110, the comparator block 130, the counter block 140, and other additional circuits. The image sensor 10 may further include a digital signal processing circuit. The digital signal processing circuit may output digital image data by performing pieces of digital signal processing based on various algorithms on the digital code. In some example embodiments, the pieces of digital signal processing may be performed by an image signal processor or an application processor, which is connected to the image sensor 10.

According to some example embodiments of the present disclosure, through the configuration, an image sensor including a comparison circuit and an ADC may efficiently output a zero-crossing prediction signal by using only a zero-crossing prediction circuit without an additional ramp signal generator or additional comparison circuit while noise performance is not reduced.

Based on the zero-crossing prediction signal, the image sensor may output a low-order bit digital code from a point in time when a zero-crossing time point is almost reached. Accordingly, power efficiency may be improved by reducing unnecessary power consumption capable of occurring from a point much earlier than the zero-crossing time point to a point in time when the zero-crossing time point is almost reached.

The comparison circuit may include a first sub-circuit, and the image sensor may control (or adjust) the bandwidth of the first sub-circuit to improve the noise performance of the image sensor. Alternatively, the image sensor may reduce the conversion error of the image sensor (in particular, an analog-digital converter) by reducing the swing range of the output signal of the first sub-circuit.

FIGS. 2A, 2B, 2C, and 2D are circuit diagrams illustrating an example of a unit pixel of the pixel array of FIG. 1.

Figure 2A:
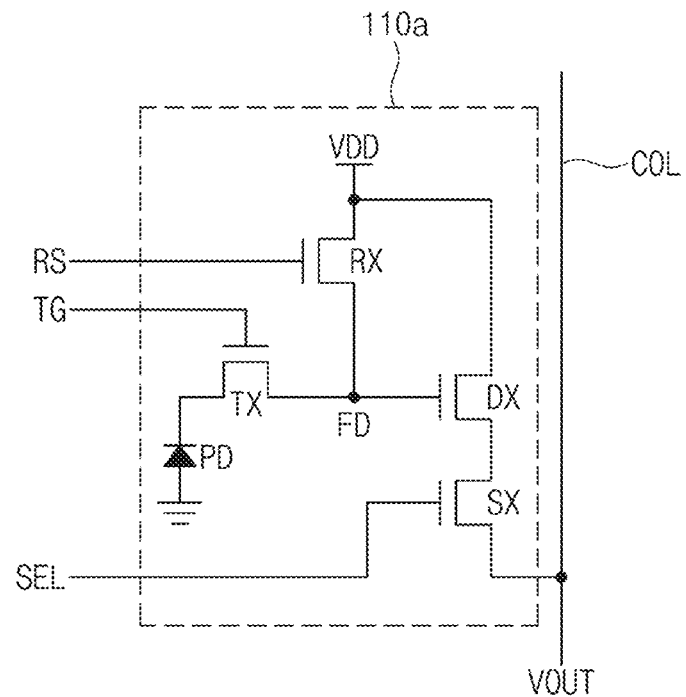
FIGS. 2A, 2B, 2C, and 2D are circuit diagrams illustrating an example of a unit pixel of the pixel array of FIG. 1.

Referring to FIG. 2A, a unit pixel 110a may include a photodiode PD as a photo sensitive device, and may include a transmission transistor TX, a reset transistor RX, a drive transistor DX, and a selection transistor SX as a read circuit for reading an analog pixel signal.

For example, the photodiode PD may include an n-type region formed on a p-type substrate, and the p-type substrate and the n-type region may form a p-n junction photodiode.

The photodiode PD may receive light incident from the outside, and may generate photo charges based on the received light.

The photo charges generated by the photodiode PD may be transmitted to a floating diffusion node FD through the transmission transistor TX. For example, when a transmission control signal TG has a first level (e.g., a high level), the transmission transistor TX may be turned on, and the photo charges generated by the photodiode PD may be transmitted to the floating diffusion node FD through the transmission transistor TX.

The drive transistor DX may amplify a signal corresponding to charges charged in the floating diffusion node FD by operating as a source follower buffer amplifier. The selection transistor SX may transmit the amplified signal to a column line COL in response to a selection signal SEL.

The floating diffusion node FD may be reset by the reset transistor RX. For example, to perform a CDS operation, the reset transistor RX may discharge photo charges stored in the floating diffusion node FD in response to a reset signal RS at a specific period.

Figure 2B:
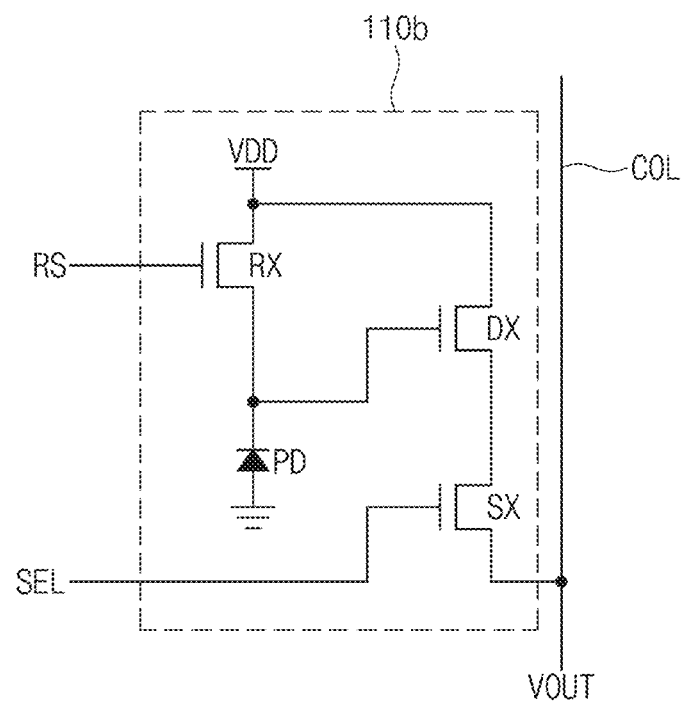
Figure 2C:
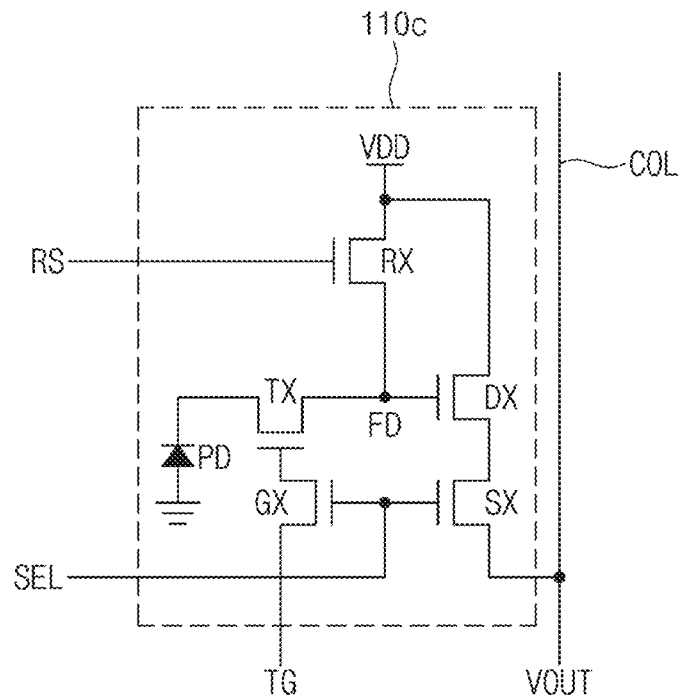
Figure 2D:
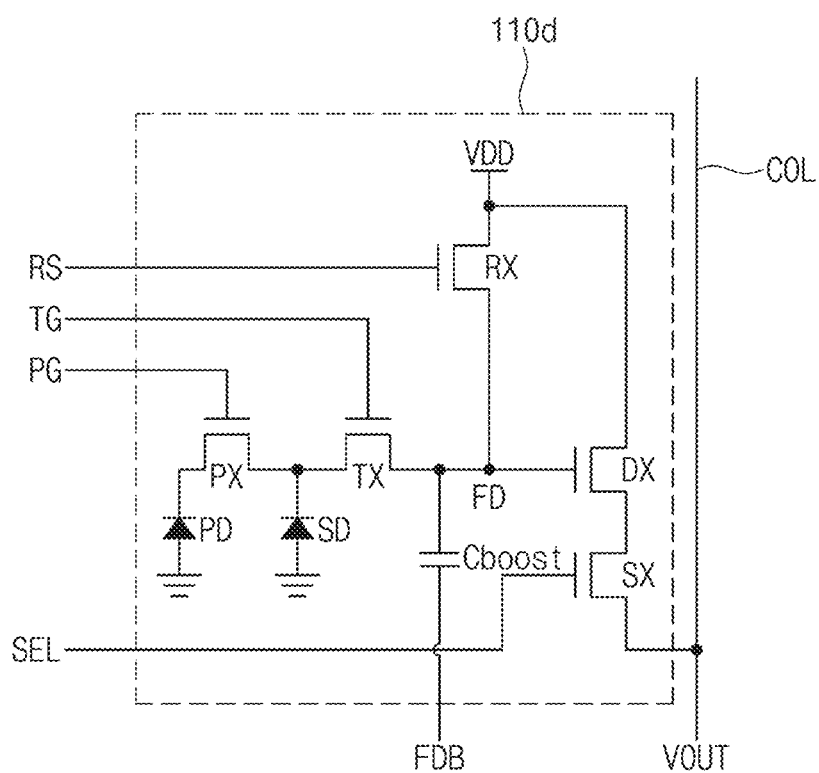

FIG. 2A illustrates a unit pixel including the one photodiode PD and the four transistors TX, RX, DX, and SX, but example embodiments according to the present disclosure is not limited thereto. FIGS. 2B to 2D illustrate other examples of a unit pixel.

Referring to FIG. 2B, a unit pixel 110b may include the photodiode PD as the photo sensitive device, and may include the reset transistor RX, the drive transistor DX, and the selection transistor SX as a read circuit. That is, the unit pixel 110b may have a 3-transistor structure.

Referring to FIG. 2C, a unit pixel 110c may include the photodiode PD as the photo sensitive device, and may include the transmission transistor TX, a gate transistor GX, the reset transistor RX, the drive transistor DX, and the selection transistor SX as the read circuit. That is, the unit pixel 110c may have a 5-transistor structure. The gate transistor GX may selectively provide the transmission control signal TG to the transmission transistor TX in response to the selection signal SEL.

Referring to FIG. 2D, a unit pixel 110d may include the photodiode PD as the photo sensitive device, may include a storage diode SD that stores photo charges generated by the photodiode PD, and may include a photo transistor PX (or a photo gate), the transmission transistor TX, the reset transistor RX, the drive transistor DX, the selection transistor SX, and a boosting capacitor Cboost as the read circuit. One end of the boosting capacitor Cboost is connected to the floating diffusion node FD, and the other end thereof may receive a boosting signal FDB. The boosting capacitor Cboost may be charged based on the boosting signal FDB. When the transmission transistor TX is turned on, the boosting capacitor Cboost may boost a voltage level of the floating diffusion node FD. That is, the unit pixel 110d may have a 5-transistor structure and may perform a global shutter operation.

Figure 3:
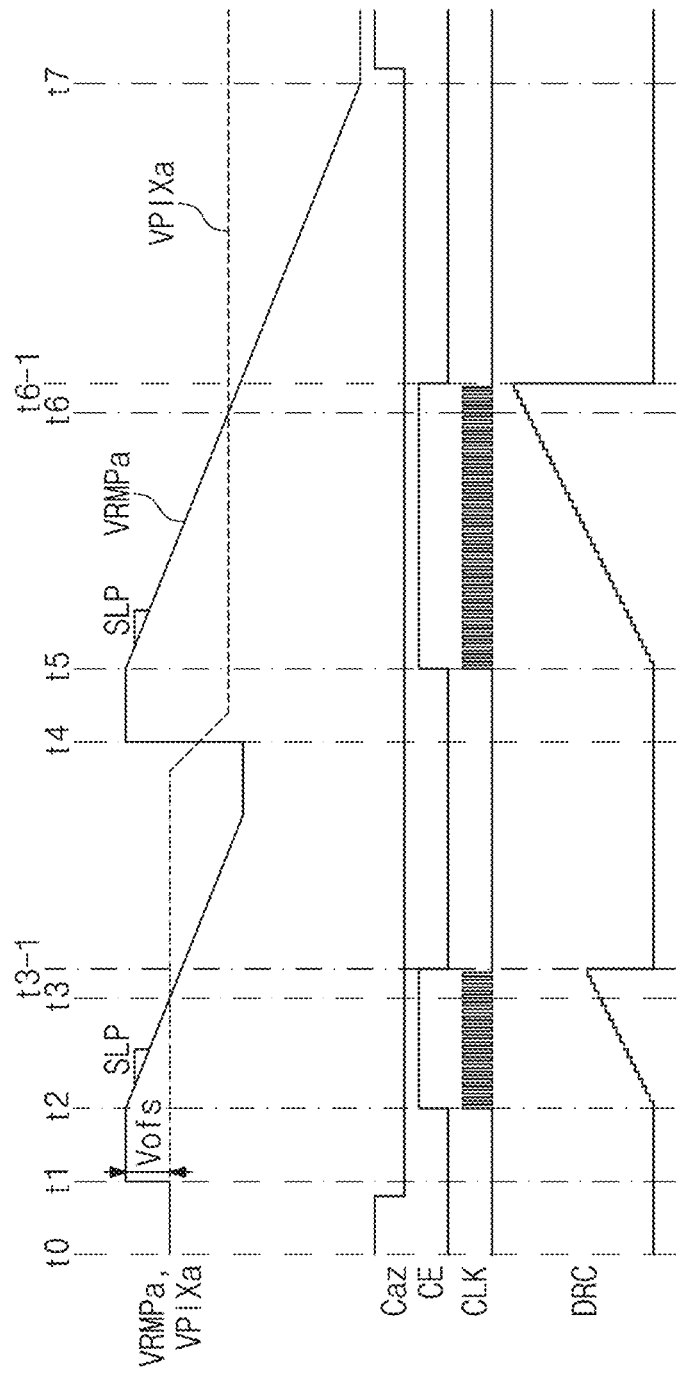
FIG. 3 is a timing diagram for describing an operation of an image sensor.

FIG. 3 is a timing diagram for describing an operation of an image sensor.

In FIG. 3 as time points t0, t1, t2, t3, t3-1, t4, t5, t6, t6-1, and t7 elapse, some of input/output signals of a comparison circuit (e.g., 130-1 of FIG. 1) and a counter circuit (e.g., 140-1 of FIG. 1), which are included in an image sensor (e.g., 10 in FIG. 1), are illustrated. Caz is a control signal for adjusting a voltage level of a ramp signal; CE is a counter enable signal; and CLK is a clock signal entered into a counter circuit. DRC is a digital code output from the counter circuit.

The image sensor may operate during a plurality of time intervals.

For example, during a time interval (from t0 to t1), a voltage level of the ramp signal VRMPa may be adjusted to be substantially the same as a voltage level of the pixel signal VPIXa.

During a time interval (from t1 to t2) and a time interval (from t4 to t5), the voltage level of the ramp signal VRMPa may be adjusted to increase by a predetermined (or alternatively, desired) level (e.g., an offset voltage Vofs).

During a time interval (t2 to t4) and a time interval (t5 to t7), the voltage level of the ramp signal VRMPa may be adjusted to change with a predetermined (or alternatively, desired) slope (e.g., SLP). For example, as shown in FIG. 3, the voltage level of the ramp signal VRMPa may be adjusted to decrease with a predetermined (or alternatively, desired) slope, but the scope of the present disclosure is not limited thereto. The voltage level of the ramp signal VRMPa may be adjusted to increase with a (or alternatively, desired) predetermined slope.

Based on the CDS operation described above with reference to FIG. 1, the pixel signal VPIXa may indicate a reset level during a time interval (from t0 to t4) and may indicate a signal level corresponding to photo charges accumulated in a pixel array during the time interval (from t4 to t7).

In some example embodiments, a time interval (from t0 to t1) may be referred to as an 'auto-zeroing interval'; a time interval (from t1 to t2) and a time interval (from t4 to t5) may be referred to as an 'offset interval'; and a time interval (from t2 to t4) and a time interval (from t5 to t7) may be referred to as an 'A/D conversion interval'.

In some example embodiments, in the A/D conversion interval, the counter circuit may output a digital code DRC including a plurality of bits. The plurality of bits may indicate digital values that increase in proportion to a predetermined (or alternatively, desired) time interval. For example, the counter circuit may be enabled based on the counter enable signal CE and the clock signal CLK from a point in time when a voltage level of the ramp signal VRMPa increased by the offset voltage Vofs starts to be changed, to a point in time (i.e., the zero-crossing time point) when the voltage level of the ramp signal VRMPa is the same as the voltage level of the pixel signal VPIXa (e.g., from t2 to t3, and from t5 to t6).

In some example embodiments, in the A/D conversion interval, the counter circuit may include a plurality of digital circuits (e.g., a plurality of flip-flops) respectively corresponding to the plurality of bits, and may be additionally enabled during a time interval (e.g., from t3 to t3-1, and from t6 to t6-1) required or used for each of (or at least one of) the digital circuits to output a valid bit value. A time interval during which the counter circuit is additionally enabled may be referred to as a 'conversion delay'.

Figure 4:
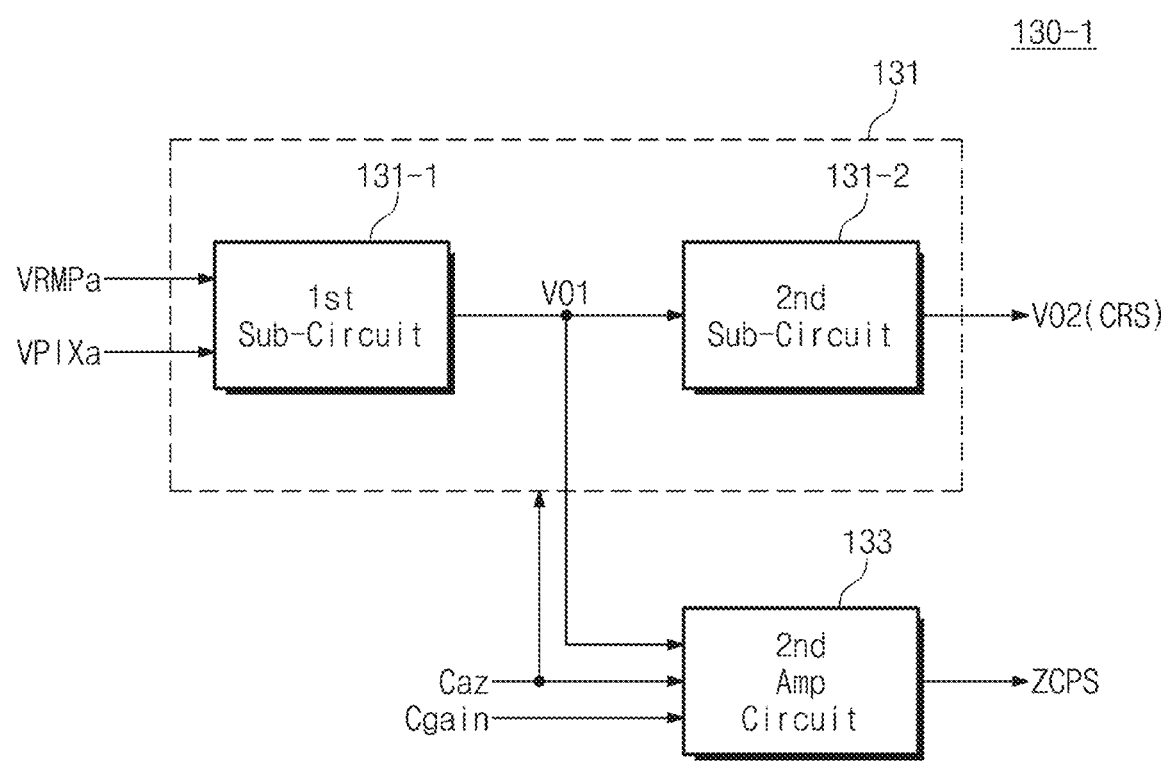
FIG. 4 is a block diagram illustrating some example embodiments of the comparison circuit of FIG. 1.

FIG. 4 is a block diagram illustrating some example embodiments of the comparison circuit of FIG. 1.

Referring to FIGS. 1 and 4, the comparison circuit 130-1 may include the first amplification circuit 131 and the second amplification circuit 133. The first amplification circuit 131 may include a first sub-circuit 131-1 and a second sub-circuit 131-2.

The first sub-circuit 131-1 may receive the pixel signal VPIXa and the ramp signal VRMPa. The first sub-circuit 131-1 may output a first output signal VO1 through a first node by comparing the pixel signal VPIXa and the ramp signal VRMPa. The second sub-circuit 131-2 may output a second output signal VO2 as a comparison result signal CRS by amplifying the first output signal VO1.

The second amplification circuit 133 may be connected to the first node included in the first amplification circuit 131 to receive the first output signal VO1. During a time interval during which a voltage level of the ramp signal VRMPa is changed, the second amplification circuit 133 may output the zero-crossing prediction signal ZCPS transitioned before the zero-crossing time point at which the voltage level of the pixel signal VPIXa becomes the same as the voltage level of the ramp signal VRMPa by amplifying the first output signal VO1.

In some example embodiments, the first amplification circuit 131 may have a first voltage gain, and the second amplification circuit 133 may have a second voltage gain lower than the first voltage gain. For example, the first voltage gain may be calculated as a product of the voltage gain of the first sub-circuit 131-1 and the voltage gain of the second sub-circuit 131-2. When the first voltage gain is mostly determined by the voltage gain of the second sub-circuit 131-2, the second voltage gain may be implemented to be lower than the voltage gain of the second sub-circuit 131-2.

The first amplification circuit 131 and the second amplification circuit 133 may further receive the control signal Caz from the outside (e.g., 180 in FIG. 1), and the second amplification circuit 133 may further receive the control signal Cgain. As described above with reference to FIG. 3, the image sensor may operate during the auto-zeroing interval, the offset interval, and the A/D conversion interval, which proceed sequentially.

The first amplification circuit 131 and the second amplification circuit 133 may determine a bias state of each of (or at least one of) the first and second amplification circuits 131 and 133 and an operating point according to the bias state by turning on/off one or more switches included in the first and second amplification circuits 131 and 133 based on the control signal Caz during the auto-zeroing interval. In this case, when input signals having the same voltage level as one another are inputted into each gate terminal of a differential circuit included in an amplification circuit, the operating point may be defined as a voltage level indicated by the output signal of the differential circuit.

The second amplification circuit 133 may adjust the second voltage gain by turning on/off one or more switches included in the second amplification circuit 133 based on the control signal Cgain.

Figure 5:
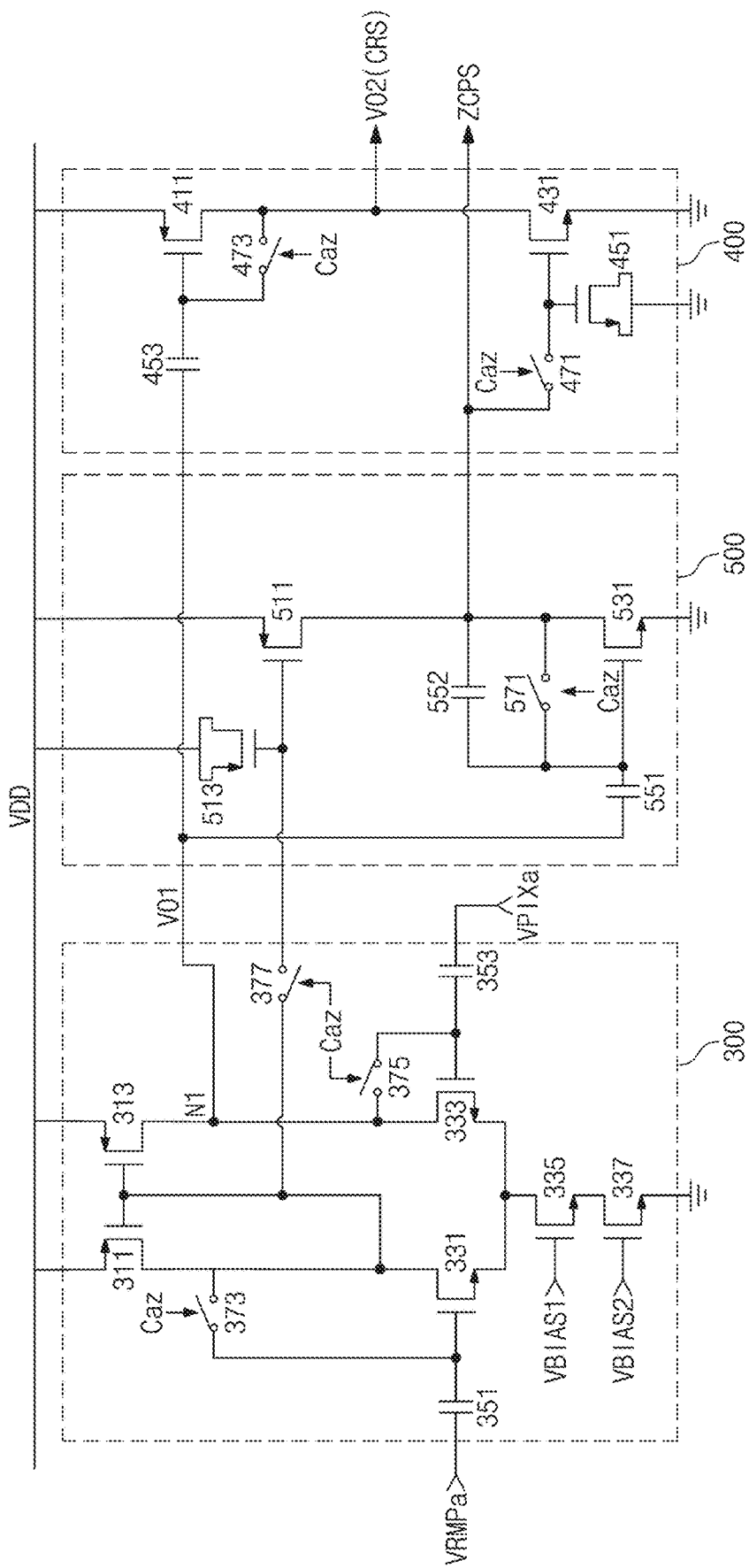
FIG. 5 is a circuit diagram illustrating some example embodiments of the comparison circuit of FIG. 1.

FIG. 5 is a circuit diagram illustrating some example embodiments of the comparison circuit of FIG. 1.

Referring to FIGS. 1, 4, and 5, a comparison circuit 130a may include a first sub-circuit 300, a second sub-circuit 400, and a zero-crossing prediction circuit 500. The first sub-circuit 300 and the second sub-circuit 400 may correspond to the first amplification circuit 131 of FIG. 1, and the zero-crossing prediction circuit 500 may correspond to the second amplification circuit 133 of FIG. 1. The first sub-circuit 300 and the second sub-circuit 400 may correspond to the first sub-circuit 131-1 and the second sub-circuit 131-2 of FIG. 4, respectively, and the zero-crossing prediction circuit 500 may correspond to the second amplification circuit 133 of FIG. 4.

The first sub-circuit 300 may include PMOS transistors 311 and 313, NMOS transistors 331, 333, 335, and 337, capacitors 351 and 353, and switches 373, 375, and 377.

The PMOS transistor 311 may be connected between a node of a power supply voltage VDD and a drain node of the NMOS transistor 331, and the PMOS transistor 313 may be connected between the node of the power supply voltage VDD and a drain node of the NMOS transistor 333. The NMOS transistors 335 and 337 may be connected between a ground voltage node and source nodes of the NMOS transistors 331 and 333. The capacitor 351 may be connected between an input terminal of the ramp signal VRMPa and a gate node of the NMOS transistor 331, and the capacitor 353 may be connected between an input terminal of the pixel signal VPIXa and a gate node of the NMOS transistor 333. The switch 373 may be connected between the gate node and the drain node of the NMOS transistor 331, and the switch 375 may be connected between the gate node and the drain node of the NMOS transistor 333. The switch 377 may be connected between a gate node of a PMOS transistor 511 of the zero-crossing prediction circuit 500 and gate nodes of the PMOS transistors 311 and 313.

The NMOS transistors 335 and 337 may supply a bias current to the first sub-circuit 300. The NMOS transistors 331 and 333 may respectively receive the pixel signal VPIXa and the ramp signal VRMPa and may output the first output signal VO1 through an output node (the drain node of the NMOS transistor 333) by comparing the pixel signal VPIXa and the ramp signal VRMPa. The capacitor 351 may perform alternating current (AC) coupling between the ramp signal VRMPa and the first sub-circuit 300, and the capacitor 353 may perform AC coupling between the pixel signal VPIXa and the first sub-circuit 300.

The switches 373, 375, and 377 may be turned on based on the control signal Caz during the auto-zeroing interval of the image sensor and thus may short opposite ends of each of (or at least one of) the switches 373, 375, and 377. In this case, one of the drain currents of the PMOS transistors 311 and 313 constituting a current mirror may be copied to the second sub-circuit 400 and the zero-crossing prediction circuit 500, and thus a bias state of each of (or at least one of) the first sub-circuit 300, the second sub-circuit 400, and the zero-crossing prediction circuit 500 may be determined.

The second sub-circuit 400 may include a PMOS transistor 411, an NMOS transistor 431, a MOS capacitor 451, a capacitor 453, and switches 471 and 473.

The PMOS transistor 411 and the NMOS transistor 431 may be connected in series between the node of the power supply voltage VDD and the ground voltage node. The MOS capacitor 451 may be connected between the gate node of the NMOS transistor 431 and the ground voltage node, and the capacitor 453 may be connected between the gate node of the PMOS transistor 411 and an output node N1 of the first sub-circuit 300. The switch 473 may be connected between the gate node and the drain node of the PMOS transistor 411, and the switch 471 may be connected between the gate node of the NMOS transistor 431 and an output node of the zero-crossing prediction circuit 500.

The PMOS transistor 411 may receive the first output signal VO1, may amplify the first output signal VO1, and may output the second output signal VO2 as the comparison result signal CRS. The capacitor 453 may perform AC coupling between the first output signal VO1 and the second sub-circuit 400.

The switches 471 and 473 may be turned on based on the control signal Caz during the auto-zeroing interval of the image sensor and thus may short opposite ends of each of (or at least one of) the switches 471 and 473. In this case, the gate voltage of the NMOS transistor 431 may be determined as a voltage level corresponding to the drain current of the PMOS transistor 411 that determines the bias state of the second sub-circuit 400, and the determined voltage level may be stored in the MOS capacitor 451.

The zero-crossing prediction circuit 500 may include the PMOS transistor 511, an NMOS transistor 531, a MOS capacitor 513, capacitors 551 and 552, and a switch 571.

The PMOS transistor 511 and the NMOS transistor 531 may be connected in series between the node of the power supply voltage VDD and the ground voltage node. The MOS capacitor 513 may be connected between the gate node of the PMOS transistor 511 and the node of the power supply voltage VDD. The capacitor 551 may be connected between the output node N1 of the first sub-circuit 300 and the gate node of the NMOS transistor 531, and the capacitor 552 may be connected between the gate node and the drain node of the NMOS transistor 531. The switch 571 may be connected between the gate node and the drain node of the NMOS transistor 531.

The NMOS transistor 531 may receive the first output signal VO1, may amplify the first output signal VO1 with an amplification gain determined by a ratio of the capacitor 551 to the capacitor 552, and may output the amplified the first output signal VO1 as the zero-crossing prediction signal ZCPS.

The switch 571 may be turned on based on the control signal Caz during the auto-zeroing interval of the image sensor and thus may short opposite ends of the switch 571. In this case, as the switch 377 of the first sub-circuit 300 is also turned on together with the switch 571, the gate voltage of the PMOS transistor 511 may be determined as a voltage level corresponding to a drain current of the PMOS transistor 511 that determines a bias state of the zero-crossing prediction circuit 500, and the determined voltage level may be stored in the MOS capacitor 513.

Figure 6:
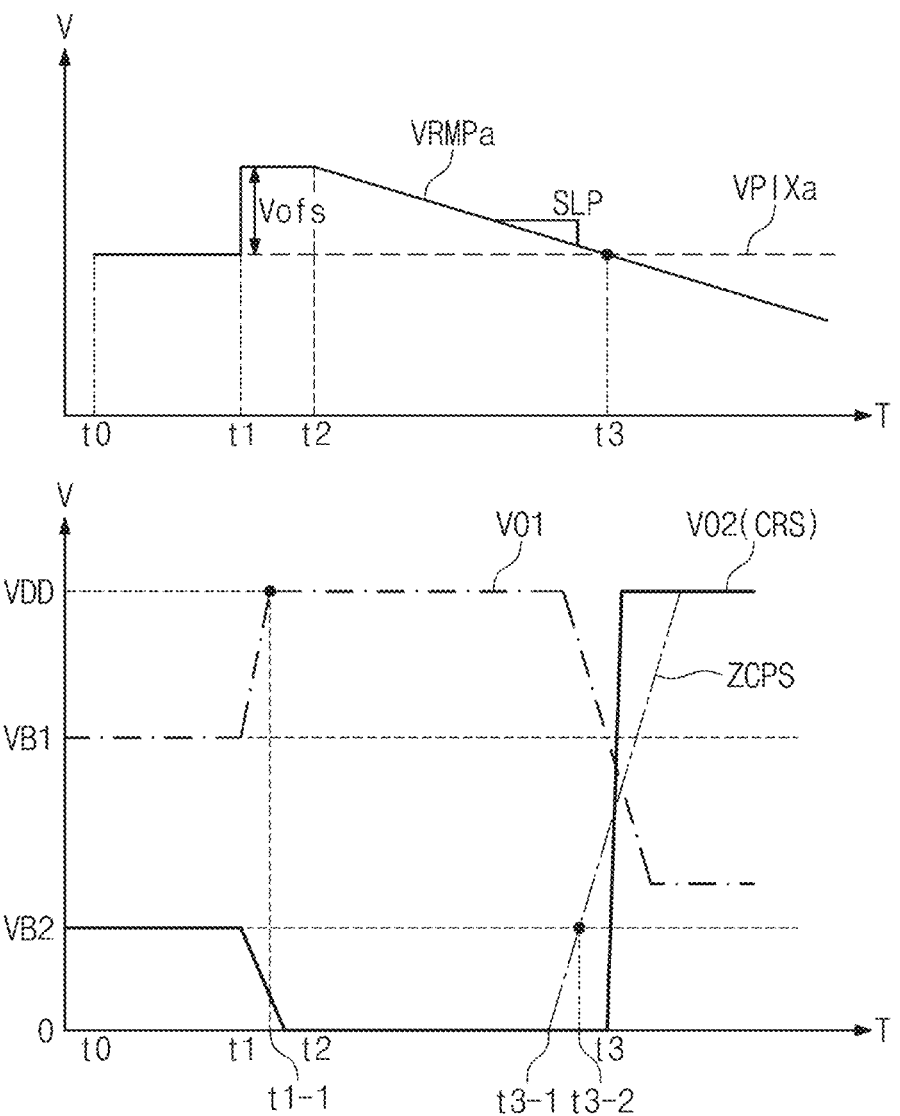
FIG. 6 is a diagram for describing input/output signals of the comparison circuit of FIG. 5.

FIG. 6 is a diagram for describing input/output signals of the comparison circuit of FIG. 5.

Referring to FIGS. 3, 5, and 6, an operating point of the first sub-circuit 300 determined depending on the corresponding bias state may correspond to 'VB1', and operating points of the second sub-circuit 400 and the zero-crossing prediction circuit 500 respectively determined depending on corresponding bias states may correspond to 'VB2'.

During an auto-zeroing interval (from t0 to t1), a voltage level of the pixel signal VPIXa may be substantially the same as the voltage level of the ramp signal VRMPa. In this case, the first output signal VO1 output by the first sub-circuit 300 may correspond to 'VB1', and each of (or at least one of) the second output signal VO2 output by the second sub-circuit 400 and the zero-crossing prediction signal ZCPS output by the zero-crossing prediction circuit 500 may correspond to 'VB2'.

During an offset interval (from t1 to t2), the voltage level of the ramp signal VRMPa may be increased by the offset voltage Vofs. In this case, all (or most) of the bias current supplied to the first sub-circuit 300 by the NMOS transistors 335 and 337 flows to the NMOS transistor 331, and thus the voltage level of the first output signal VO1 is rapidly saturated (i.e., may increase) with the power supply voltage VDD at t1-1, and voltage levels of the second output signal VO2 and the zero-crossing prediction signal ZCPS may be rapidly saturated (i.e., may decrease) to a ground voltage.

During the A/D conversion interval (after t2), a voltage level of the ramp signal VRMPa may be changed with a constant slope. In this case, the voltage level of the first output signal VO1 may go out of saturation and then may decrease gradually, and the voltage levels of the second output signal VO2 and the zero-crossing prediction signal ZCPS may go out of saturation and then may increase. However, the voltage gain of the zero-crossing prediction circuit 500 (e.g., the second amplification circuit 133 of FIG.

4) is lower than that of the second sub-circuit 400 (e.g., the second sub-circuit 131-2 or the first amplification circuit 131 of FIG. 4), the zero-crossing prediction signal ZCPS may go out of saturation before the second output signal VO2 goes out of saturation. For example, the second output signal VO2 may go out of saturation at t3, but the zero-crossing prediction signal ZCPS may go out of saturation at t3-1 before t3, and may increase to 'VB2', which corresponds to an operating point of the zero-crossing prediction circuit 500, at t3-2. Accordingly, the zero-crossing prediction signal ZCPS transitioned before the zero-crossing time point (e.g., t3) when the voltage level of the pixel signal VPIXa become the same as the voltage level of the ramp signal VRMPa, and thus may function as a signal for predicting the zero-crossing time point.

Figure 7:
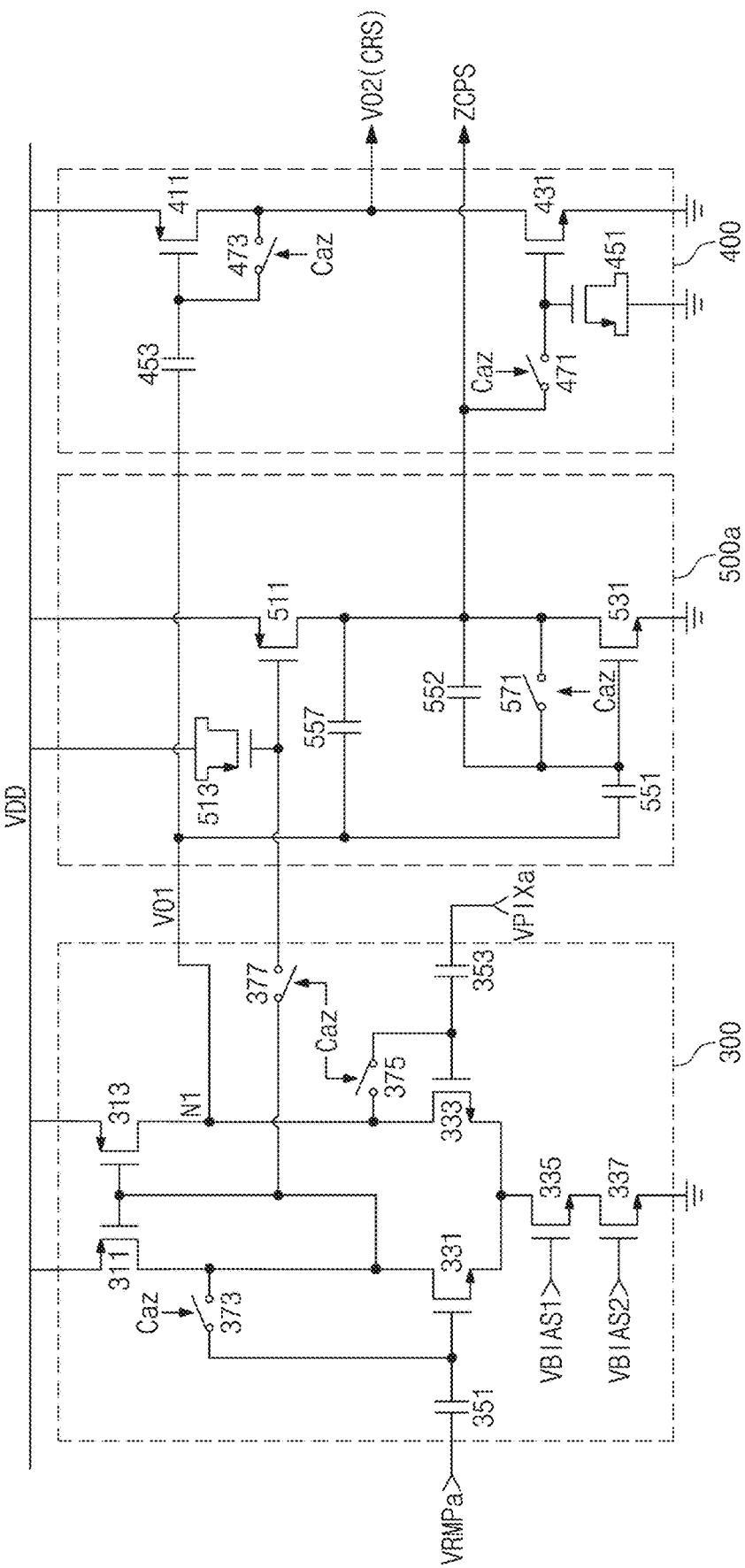
FIG. 7 is a circuit diagram illustrating some example embodiments of the comparison circuit of FIG. 1.

FIG. 7 is a circuit diagram illustrating some example embodiments of the comparison circuit of FIG. 1.

Referring to FIGS. 1, 5, and 7, a comparison circuit 130b may include the first sub-circuit 300, the second sub-circuit 400, and a zero-crossing prediction circuit 500a. The comparison circuit 130b has only some differences in a configuration of the zero-crossing prediction circuit 500a compared to the comparison circuit 130a, a description of the first and second sub-circuits 300 and 400 will be omitted to avoid redundancy.

The zero-crossing prediction circuit 500a may include the PMOS transistor 511, the NMOS transistor 531, the MOS capacitor 513, the capacitors 551 and 552 and a switch 571, and may further include a capacitor 557.

The capacitor 557 may be connected between a drain node of the NMOS transistor 531 and the output node of the first sub-circuit 300.

Figure 8:
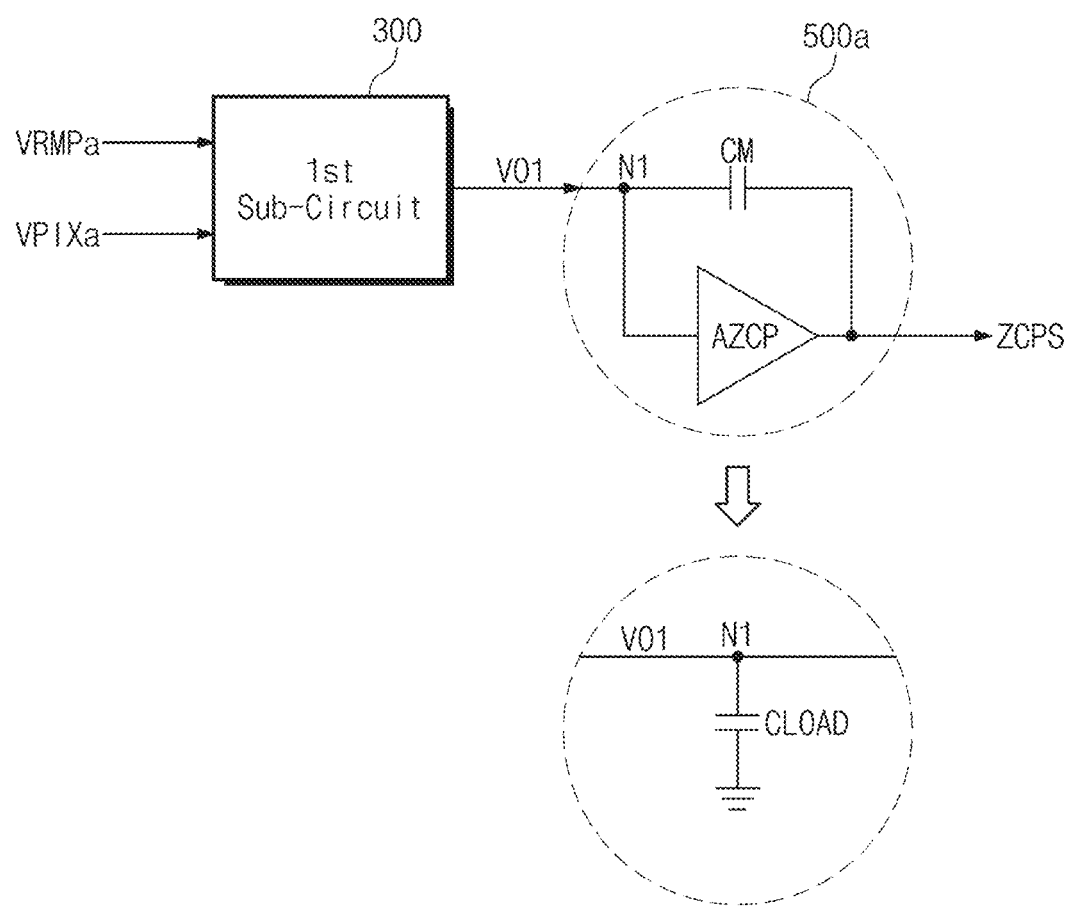
FIG. 8 is a diagram for describing control of a bandwidth by the comparison circuit of FIG. 7.

FIG. 8 is a diagram for describing control of a bandwidth by the comparison circuit of FIG. 7.

Referring to FIGS. 7 and 8, the zero-crossing prediction circuit 500a may be connected to the output node N1 of the first sub-circuit 300. The one end of the capacitor 551 connected to the capacitor 557 and the drain node of the NMOS transistor 531 may correspond to an input node and output node of the zero-crossing prediction circuit 500a, respectively, and thus the capacitor 557 may cause Miller effect. For example, the capacitor 557 may operate as a Miller capacitor having capacitance CM.

Accordingly, when the zero-crossing prediction circuit 500a has a voltage gain as much as AZCP, the magnitude of the capacitor load CLOAD of the first sub-circuit 300 may be increased to a value of "AZCP×CM".

The noise performance of the comparison circuit 130b may be mainly affected by frequency response characteristics of the first sub-circuit 300. For example, the noise performance of the comparison circuit 130b may be inversely proportional to the square root of a bandwidth of the first sub-circuit 300. In this case, the noise performance may be increased by reducing the bandwidth of the first sub-circuit 300. Moreover, the noise performance of the comparison circuit 130b may be effectively increased by the increased capacitor load CLOAD by reducing the bandwidth of the first sub-circuit 300 while the decrease in integration is minimized or reduced.

Figure 9:
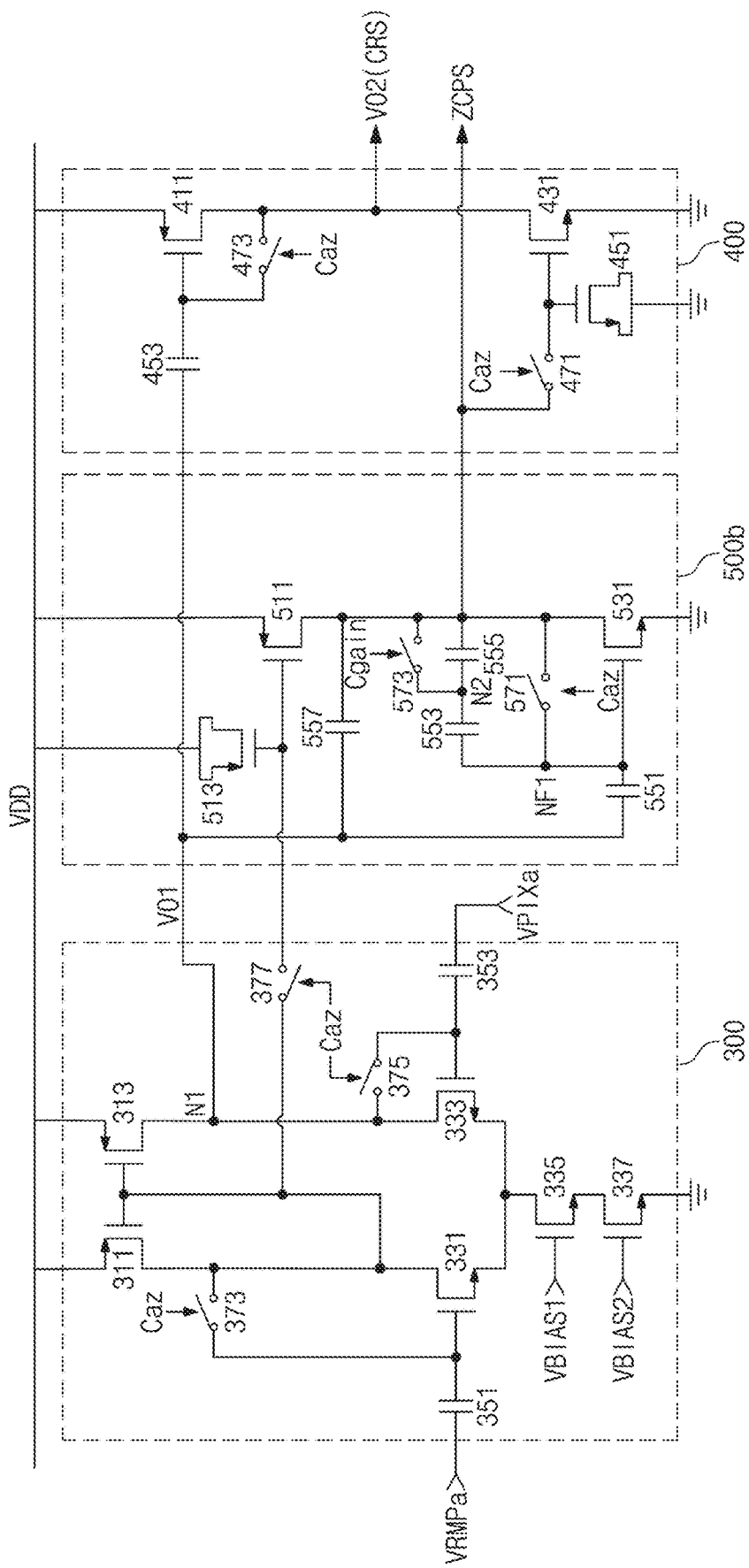
FIG. 9 is a circuit diagram illustrating some example embodiments of the comparison circuit of FIG. 1.

FIG. 9 is a circuit diagram illustrating some example embodiments of the comparison circuit of FIG. 1.

Referring to FIGS. 1, 5, 7, and 9, a comparison circuit 130c may include the first sub-circuit 300, the second sub-circuit 400, and a zero-crossing prediction circuit 500b. The comparison circuit 130c has only some differences in a configuration of the zero-crossing prediction circuit 500b compared to the comparison circuit 130b, a description of the first and second sub-circuits 300 and 400 will be omitted to avoid redundancy.

The zero-crossing prediction circuit 500b may include the PMOS transistor 511, the NMOS transistor 531, the MOS capacitor 513, the capacitors 551, 553, 555, and 557, and the switch 571, and may further include a switch 573.

The capacitors 553 and 555 may be connected in series between the gate node and the drain node of the NMOS transistor 531, and the switch 573 may be connected between the drain node of the NMOS transistor 531 and a node N2 that is positioned between the capacitors 553 and 555. The capacitor 553 may be referred to as a "first adjustment capacitor"; the capacitor 555 may be referred to as a "second adjustment capacitor"; and the switch 573 may be referred to as a "gain adjustment switch".

Figures 10, 11:
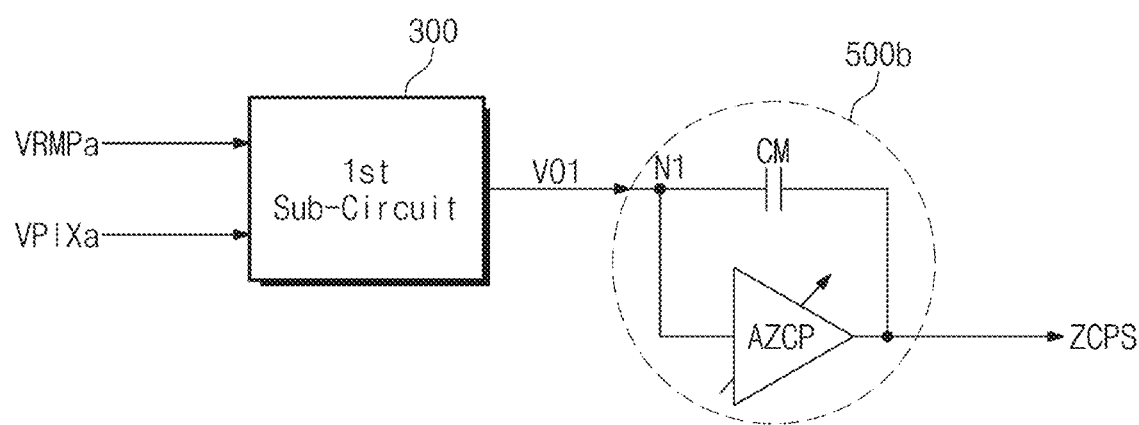
FIG. 10 is a diagram for describing adjustment of a bandwidth by the comparison circuit of FIG. 9.
FIG. 11 is a diagram for describing an operation of a switch included in the comparison circuit of FIG. 9.
Figure 12:
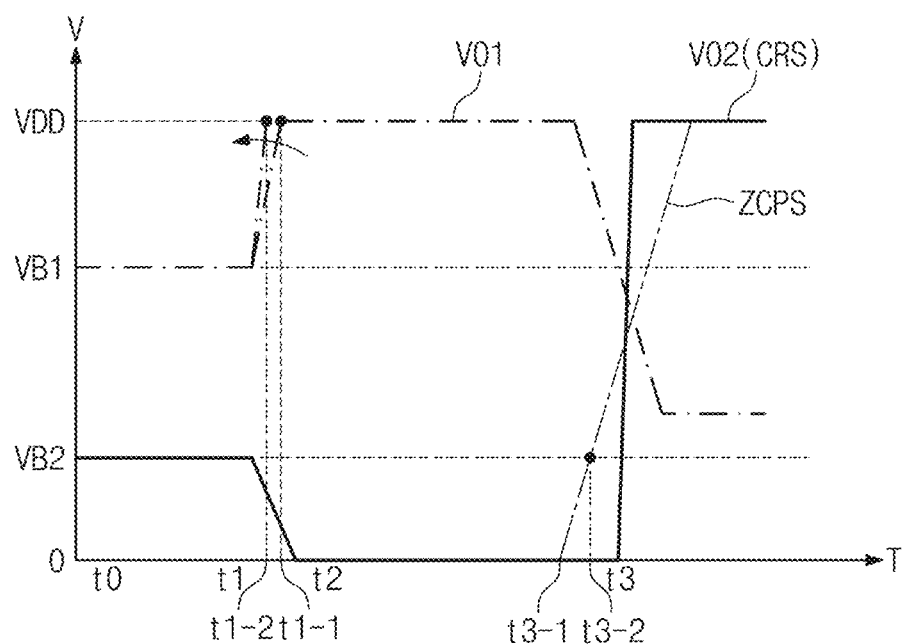
FIG. 12 is a diagram for describing input/output signals of the comparison circuit of FIG. 9.

FIG. 10 is a diagram for describing adjustment of a bandwidth by the comparison circuit of FIG. 9. FIG. 11 is a diagram for describing an operation of a switch included in the comparison circuit of FIG. 9. FIG. 12 is a diagram for describing input/output signals of the comparison circuit of FIG. 9.

Referring to FIGS. 9 and 10, the zero-crossing prediction circuit 500b may be connected to the output node N1 of the first sub-circuit 300. The combined capacitance obtained by combining the first adjustment capacitor and the second adjustment capacitor may be increased/decreased by turning on/off the switch 573, and the voltage gain of the zero-crossing prediction circuit 500b may be determined as a ratio of the capacitance of the capacitor 551 to the combined capacitance.

As described above with reference to FIGS. 3 and 6, during the auto-zeroing interval and offset interval of an image sensor, the operating performance of a comparison circuit may be more important than the noise performance of the comparison circuit. During the A/D conversion interval of the image sensor, the noise performance of the comparison circuit may be more important than the operation performance of the comparison circuit.

Referring to FIGS. 9, 10, and 11, during the auto-zeroing interval and the offset interval, the control signal Cgain for controlling an on/off operation of the switch 573 may correspond to a first value (e.g., HIGH), and thus the switch 573 may be turned on. During the A/D conversion interval, the control signal Cgain may correspond to a second value (e.g., LOW), and thus the switch 573 may be turned off.

In some example embodiments, when the switch 573 is turned on to short opposite ends of the switch 573, the magnitude of the combined capacitance may be increased to reduce a voltage gain of the zero-crossing prediction circuit 500b. When the switch 573 is turned off to open opposite ends of the switch 573, the magnitude of the combined capacitance may be decreased to increase the voltage gain of the zero-crossing prediction circuit 500b.

Referring to FIGS. 6, 9, and 12, an operating point of the first sub-circuit 300 may correspond to 'VB1', and each of (or at least one of) operating points of the second sub-circuit 400 and the zero-crossing prediction circuit 500 may correspond to 'VB2'.

During the auto-zeroing interval (from t0 to t1), the first output signal VO1 output by the first sub-circuit 300 may correspond to 'VB1', and each of (or at least one of) the second output signal VO2 output by the second sub-circuit 400 and the zero-crossing prediction signal ZCPS output by the zero-crossing prediction circuit 500b may correspond to 'VB2'.

During the offset interval (from t1 to t2), the voltage level of the first output signal VO1 is rapidly saturated (i.e., may increase) with the power supply voltage VDD at t1-2, and voltage levels of the second output signal VO2 and the zero-crossing prediction signal ZCPS may be rapidly saturated (i.e., may decrease) to a ground voltage.

During the A/D conversion interval (after t2), a voltage level of the ramp signal VRMPa may be changed with a constant slope. In this case, the voltage level of the first output signal VO1 may go out of saturation and then may decrease gradually, and the voltage levels of the second output signal VO2 and the zero-crossing prediction signal ZCPS may go out of saturation and then may increase.

In some example embodiments, when the voltage gain of the zero-crossing prediction circuit 500b is reduced during the auto-zeroing interval and the offset interval, the level of the capacitor load according to Miller effect generated by the capacitor 557 may be relatively reduced, and thus the bandwidth of the first sub-circuit 300 may be relatively increased. In this case, compared with the example embodiment shown in FIG. 6, at t1-2 before t1-1, the voltage level of the first output signal VO1 may be rapidly saturated with the power supply voltage VDD.

In some example embodiments, when the voltage gain of the zero-crossing prediction circuit 500b is increased during the A/D conversion interval, the level of the capacitor load according to Miller effect may be relatively increased, and thus the bandwidth of the first sub-circuit 300 may be reduced relatively. Accordingly, during the auto-zeroing interval and the offset interval, the operating performance of a comparison circuit may be relatively increased. During the A/D conversion interval, the noise performance of the comparison circuit may be relatively increased.

Figure 13:
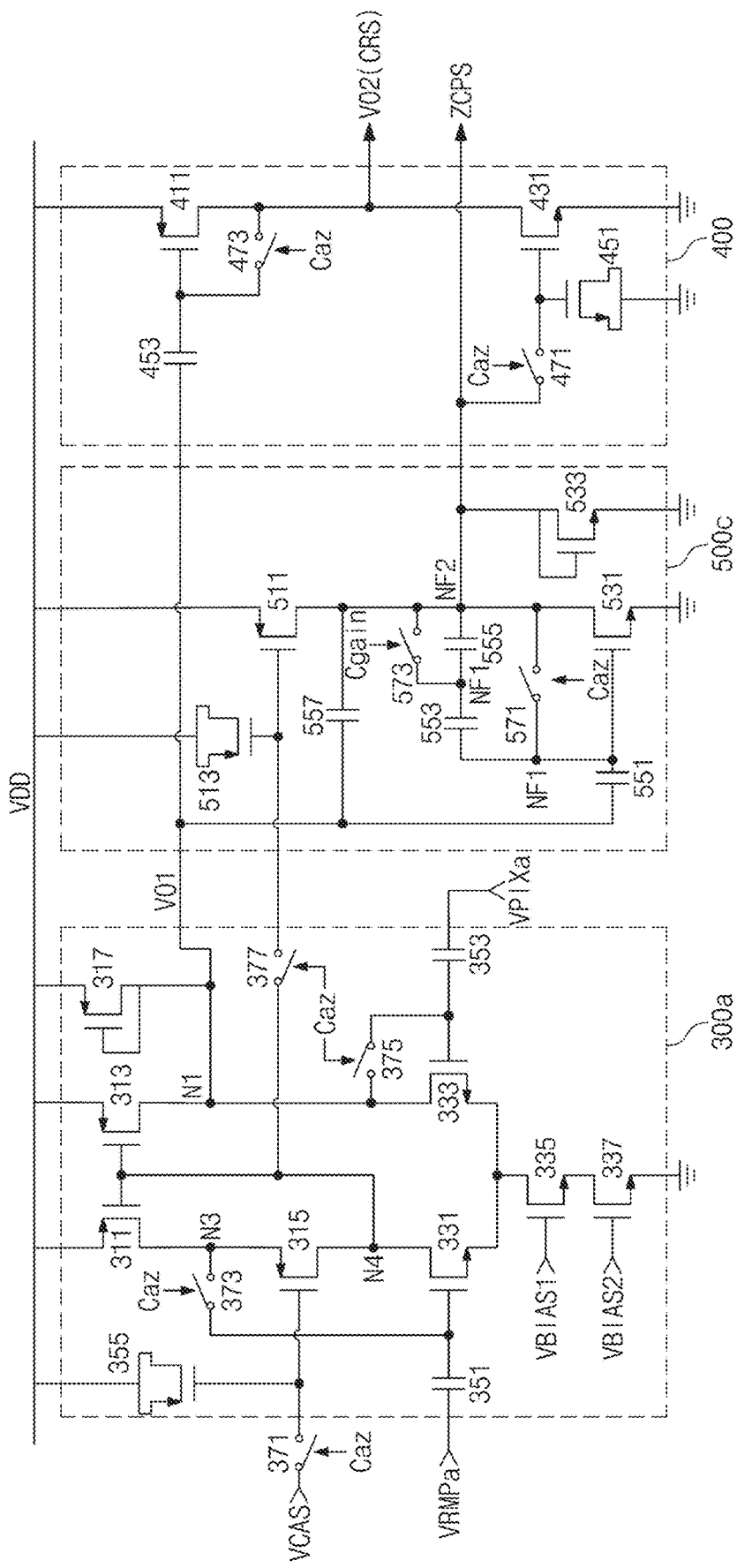
FIG. 13 is a circuit diagram illustrating some example embodiments of the comparison circuit of FIG. 1.

FIG. 13 is a circuit diagram illustrating some example embodiments of the comparison circuit of FIG. 1.

Referring to FIGS. 1, 5, 7, 9, and 13, a comparison circuit 130d may include a first sub-circuit 300a, the second sub-circuit 400, and a zero-crossing prediction circuit 500c. The comparison circuit 130d has only some differences in configurations of the first sub-circuit 300a and the zero-crossing prediction circuit 500c compared to the comparison circuit 130c, a description of the second sub-circuit 400 will be omitted to avoid redundancy.

The first sub-circuit 300a may include the PMOS transistors 311 and 313, the NMOS transistors 331, 333, 335, and 337, the capacitors 351 and 353, and the switches 373, 375, and 377, and may further include a PMOS transistor 315, an MOS capacitor 355, and a switch 371.

In some example embodiments, the first sub-circuit 300a may include a differential circuit, a current mirror circuit, and a bias circuit. The differential circuit may receive the pixel signal VPIXa and the ramp signal VRMPa and may include the NMOS transistors 331 and 333. The current mirror circuit may be connected between the differential circuit and a node of the power supply voltage VDD and may include the PMOS transistors 311, 313, and 315. The PMOS transistor 311 may be connected between the node of the power supply voltage VDD and a node N3; the PMOS transistor 315 may be connected between the node N3 and a node N4; and, the PMOS transistor 313 may be connected between the node of the power supply voltage VDD and the node N1. A gate node of the PMOS transistor 311 may be electrically connected to a gate node of the PMOS transistor 313 and the node N4.

The PMOS transistor 315 may be connected between a drain node of the PMOS transistor 311 and a drain node of the NMOS transistor 331; the MOS capacitor 355 may be connected between a gate node of the PMOS transistor 315 and the node of the power supply voltage VDD; and, the switch 371 may be connected between an input terminal of an operating point control signal VCAS and the gate node of the PMOS transistor 315.

The NMOS transistors 335 and 337 may supply a bias current to the first sub-circuit 300a. The NMOS transistors 331 and 333 may respectively receive the pixel signal VPIXa and the ramp signal VRMPa and may output the first output signal VO1 through an output node (the drain node of the NMOS transistor 333) by comparing the pixel signal VPIXa and the ramp signal VRMPa. The capacitor 351 may perform AC coupling between the ramp signal VRMPa and the NMOS transistor 331, and the capacitor 353 may perform AC coupling between the pixel signal VPIXa and the NMOS transistor 333.

The switches 371, 373, 375, and 377 may be turned on based on the control signal Caz during the auto-zeroing interval of the image sensor and thus may short opposite ends of each of (or at least one of) the switches 371, 373, 375, and 377. In this case, one of the drain currents of the PMOS transistors 311, 313, and 315 constituting the current mirror may be copied to the second sub-circuit 400 and the zero-crossing prediction circuit 500c, and thus a bias state of each of (or at least one of) the first sub-circuit 300a, the second sub-circuit 400, and the zero-crossing prediction circuit 500c may be determined.

As described above with reference to FIG. 5, the first sub-circuit 300a and the second sub-circuit 400 may correspond to the first amplification circuit 131 of FIG. 1, and the zero-crossing prediction circuit 500c may correspond to the second amplification circuit 133 of FIG. 1. The first amplification circuit 131 may have a first voltage gain, and the second amplification circuit 133 may have a second voltage gain lower than the first voltage gain. However, as described above with reference to FIGS. 7 and 8, to increase the noise performance of the comparison circuit 130b by generating Miller effect, the second voltage gain may be set as high as possible within the upper limit of the first voltage gain. When, during the A/D conversion interval of the image sensor, the voltage level of the zero-crossing prediction signal ZCPS is rapidly saturated with the power supply voltage VDD before a voltage level of the first output signal VO1 output by the first sub-circuit 300a gradually decreases from the power supply voltage VDD to reach the operating point of the first sub-circuit 300a, Miller effect may disappear and then conversion errors may occur during the A/D conversion interval. To solve this issue, the swing range of the first output signal VO1 may be reduced.

In some example embodiments, the operating point of the first sub-circuit 300a may be determined to be greater than the operating point of the first sub-circuit 300 illustrated in FIGS. 5, 7 and 9 by adjusting the bias state of the first sub-circuit 300a. When the operating point of the first sub-circuit 300a is increased, the conversion errors may be prevented or hindered in advance from occurring by reducing a time required or used for the voltage level of the first output signal VO1 to reach the operating point of the first sub-circuit 300a during the A/D conversion interval.

The first sub-circuit 300a may further include a MOS diode 317, and the zero-crossing prediction circuit 500c may further include a MOS diode 533.

The MOS diode 317 may be connected between the drain node of the PMOS transistor 313 and the node of the power supply voltage VDD. The MOS diode 533 may be connected between the drain node of the NMOS transistor 531 and a node of the ground voltage. The MOS diodes 317 and 533 may minimize or reduce the occurrence of power noise due to a sudden change in current after the A/D conversion interval.

Figure 14:
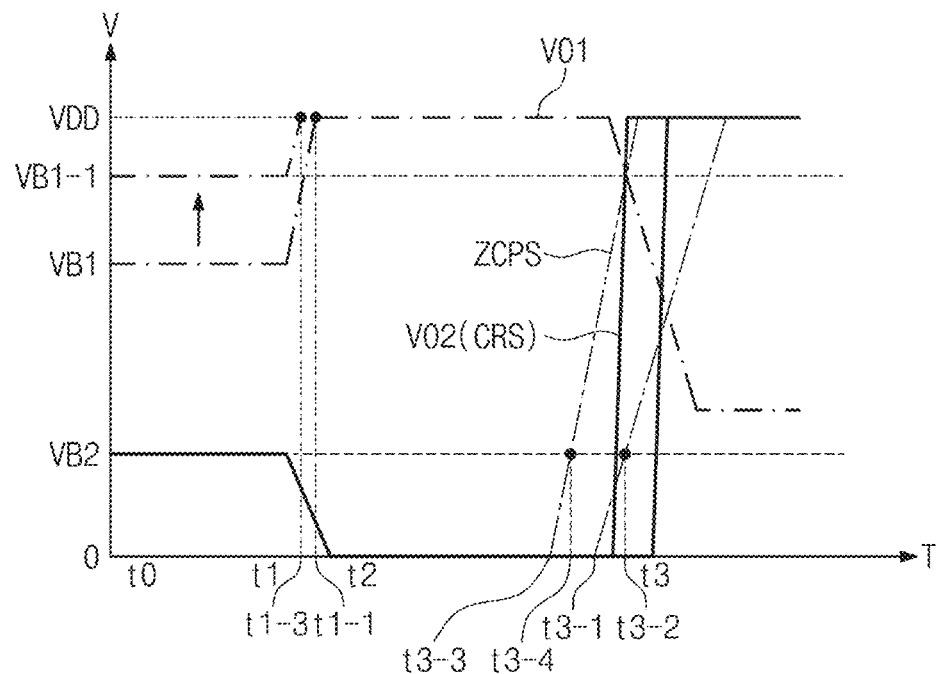
FIG. 14 is a diagram for describing input/output signals of the comparison circuit of FIG. 13.

FIG. 14 is a diagram for describing input/output signals of the comparison circuit of FIG. 13.

Referring to FIGS. 3, 13, and 14, an operating point of the first sub-circuit 300a may correspond to 'VB1-1', and each of (or at least one of) operating points of the second sub-circuit 400 and the zero-crossing prediction circuit 500c may correspond to 'VB2'. The operating point of the first sub-circuit 300a may be determined to be greater than the operating point of the first sub-circuit 300 illustrated in FIGS. 5, 7 and 9.

During an auto-zeroing interval (from t0 to t1), the first output signal VO1 output by the first sub-circuit 300a may correspond to 'VB1-1'. During an offset interval (from t1 to t2), a voltage level of the first output signal VO1 is rapidly saturated (i.e., may increase) with the power supply voltage VDD at t1-3. During an A/D conversion interval (after t2), the voltage level of the first output signal VO1 may go out of saturation and may decrease gradually.

In some example embodiments, as the operating point of the first sub-circuit 300a increases from 'VB1' to 'VB1-1', a time at which the first output signal VO1 is saturated with the power supply voltage VDD during the offset interval may be changed from t1-1 to t1-3, and a time required or used for the first output signal VO1 to reach the operating point of the first sub-circuit 300a from the power supply voltage VDD during the A/D conversion interval may be shortened. In this case, a point in time when the zero-crossing prediction signal ZCPS is transitioned may be changed from t3-1 to t3-3, and a point in time when the zero-crossing prediction signal ZCPS reaches the operating point of the zero-crossing prediction circuit 500c may be changed from t3-2 to t3-4.

In some example embodiments, to increase the operating point of the first sub-circuit 300a, a voltage level (e.g., a voltage level at the node N3) of a source voltage of the PMOS transistor 315 may be set to a minimum or lower voltage at which the PMOS transistor 311 operates in the saturation region. For example, the voltage level of the source voltage of the PMOS transistor 315 may be determined as an overdrive voltage of the PMOS transistor 311. The overdrive voltage may correspond to a difference between a gate-source voltage of the PMOS transistor 311 and a threshold voltage of the PMOS transistor 311. In this case, the operating point control signal VCAS may be determined as a gate voltage corresponding to the voltage level of the source voltage of the PMOS transistor 351.

Figure 15:
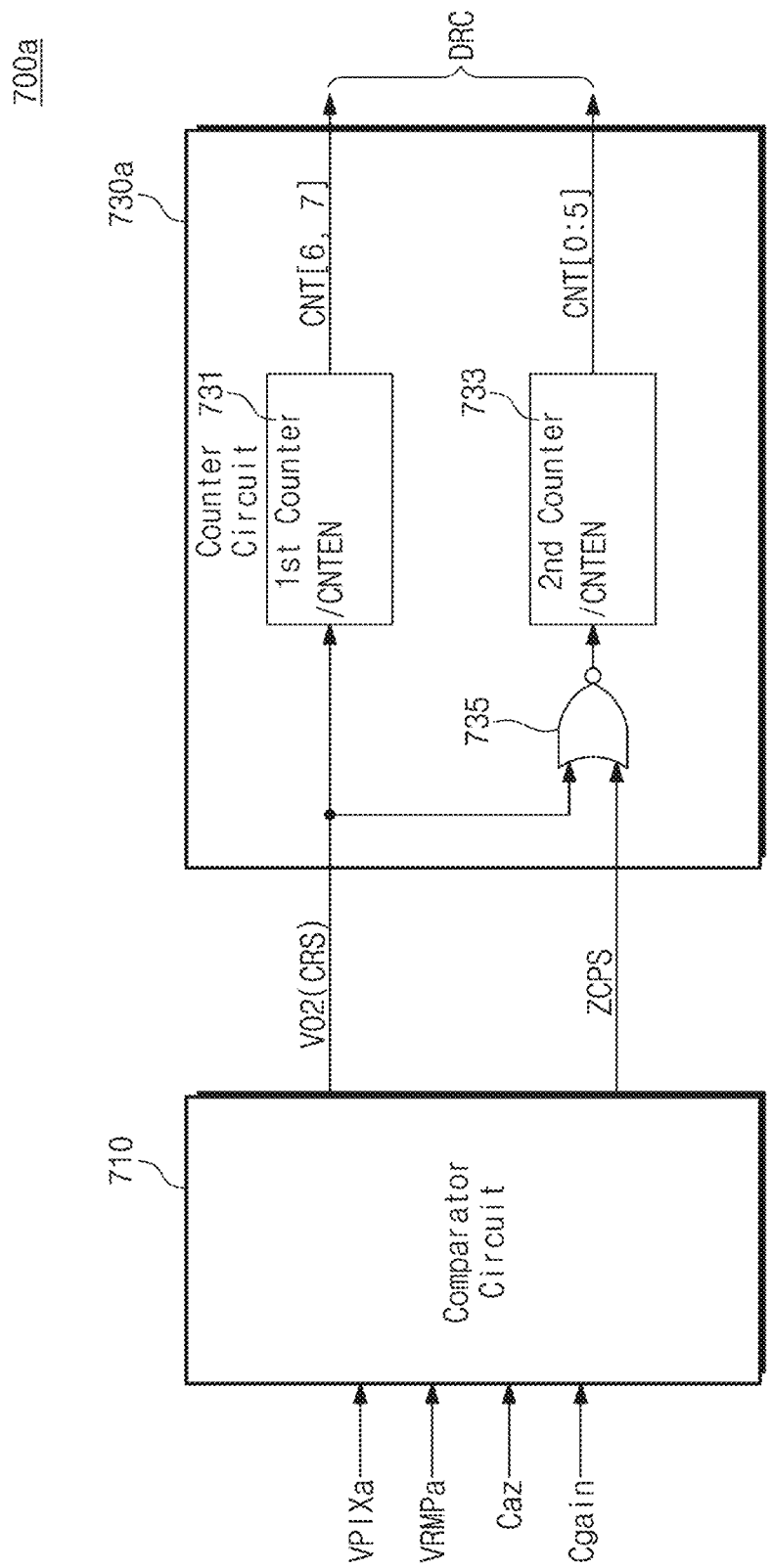
FIG. 15 is a block diagram illustrating some example embodiments of the analog-digital converter of FIG. 1.

FIG. 15 is a block diagram illustrating some example embodiments of the analog-digital converter of FIG. 1.

Referring to FIGS. 1 and 15, an ADC 700a may include a comparison circuit 710 and a counter circuit 730a. The comparison circuit 710 may correspond to the comparison circuit 130-1 of FIG. 1, and the counter circuit 730a may correspond to the counter circuit 140-1 of FIG. 1.

The comparison circuit 710 may receive the pixel signal VPIXa, the ramp signal VRMPa, and the control signals Caz and Cgain. The comparison circuit 710 may output the comparison result signal VO2(CRS) based on the pixel signal VPIXa and the ramp signal VRMPa, and then may output the zero-crossing prediction signal ZCPS transitioned before a zero-crossing time point at which a voltage level of the pixel signal VPIXa becomes the same as a voltage level of the ramp signal VRMPa, during a time interval during which the voltage level of the ramp signal VRMPa is changed. The comparison circuit 710 may include one or more capacitors and one or more switches. The comparison circuit 710 may turn on/off the one or more switches during one or more time intervals among a plurality of time intervals based on the control signals Caz and Cgain.

The counter circuit 730a may include a first counter 731, a second counter 733, and a NOR gate 735.

The counter circuit 730a may receive the comparison result signal VO2(CRS) and the zero-crossing prediction signal ZCPS from the comparison circuit 710, may output a low-order bit digital code based on the zero-crossing prediction signal ZCPS, and may stop the output of the low-order bit digital code based on the comparison result signal VO2(CRS).

In some example embodiments, the first counter 731 may output a high-order bit digital code, and the second counter 733 may output the low-order bit digital code. For example, when the counter circuit 730a corresponds to a multi-bit counter circuit generating a digital code (DRC) including a plurality of bits, the first counter 731 may output the high-order bit digital code including the most significant bit, and the second counter 733 may output a low-order bit digital code including the least significant bit. For example, when the counter circuit 730a corresponds to an 8-bit counter circuit, the first counter 731 may output a digital code CNT[6, 7], and the second counter 733 may output a digital code CNT[0:5], but this is only an example.

In some example embodiments, the comparison result signal VO2(CRS) may be input to a counter enable terminal "/CNTEN" of the first counter 731; the comparison result signal VO2(CRS) and the zero-crossing prediction signal ZCPS may be input to input terminals of the NOR gate 735; and an output signal of the NOR gate 735 may be input to the counter enable terminal "/CNTEN" of the second counter 733.

The counter circuit 730a may independently enable/disable the first counter 731 and the second counter 733.

In some example embodiments, the counter circuit 730a may enable the first counter 731 based on a point in time when one of a plurality of time intervals at which the image sensor as described above with reference to FIG. 3 operates is started. For example, although not shown in FIG. 15, the counter circuit 730a may enable the first counter 731, through a separate control signal or by using the voltage level of the ramp signal VRMPa in response to a voltage level of the ramp signal VRMPa being changed with a constant slope in the A/D conversion interval of an image sensor.

In some example embodiments, the counter circuit 730a may enable the second counter 733 based on the zero-crossing prediction signal ZCPS. For example, the counter circuit 730a may enable the second counter 733 in response to a voltage level of the zero-crossing prediction signal ZCPS being increased to be greater than or equal to a first predetermined (or alternatively, desired) voltage level. For example, the first voltage level may correspond to an operating point of the zero-crossing prediction circuit.

In some example embodiments, the counter circuit 730a may disable the first counter 731 and the second counter 733 based on the comparison result signal VO2(CRS). For example, the counter circuit 730a may disable the first counter 731 and the second counter 733 in response to a voltage level of the comparison result signal VO2(CRS) being increased to be greater than or equal to a second predetermined (or alternatively, desired) voltage level. For example, the second voltage level may correspond to an operating point of the second sub-circuit.

In some example embodiments, the first counter 731 may output the high-order bit digital code in response to the voltage level of the ramp signal VRMPa being changed with a constant slope, and may not output the high-order bit digital code in response to a voltage level of the comparison result signal VO2(CRS) being increased to be greater than or equal to the second voltage level.

In some example embodiments, the second counter 733 outputs the low-order bit digital code in response to a voltage level of the zero-crossing prediction signal ZCPS being increased to be greater than or equal to the first voltage level, and may not output the low-order bit digital code in response to the voltage level of the comparison result signal VO2(CRS) being increased to be greater than or equal to the second voltage level.

Figure 16:
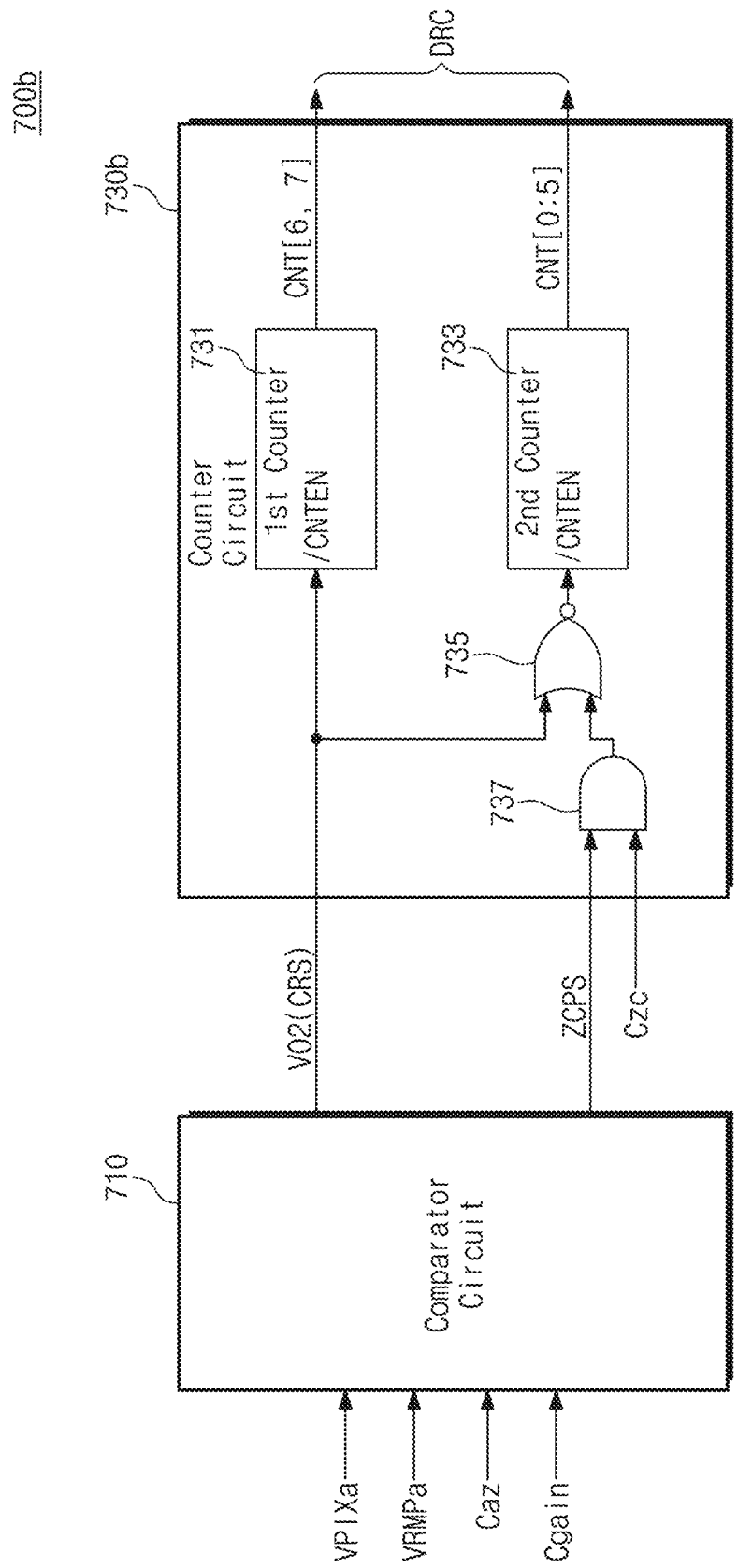
FIG. 16 is a block diagram illustrating some example embodiments of the ADC of FIG. 1.

FIG. 16 is a block diagram illustrating some example embodiments of the ADC of FIG. 1.

Referring to FIGS. 1, 15, and 16, an ADC 700b may include the comparison circuit 710 and a counter circuit 730b. The ADC 700b has only some differences in configurations of the counter circuit 730b compared to the ADC 700a, a description of the comparison circuit 710 will be omitted to avoid redundancy.

The counter circuit 730b may include the first counter 731, the second counter 733, and the NOR gate 735, and may further include an AND gate 737.

The counter circuit 730b may receive the comparison result signal VO2(CRS) and the zero-crossing prediction signal ZCPS from the comparison circuit 710, and may receive the control signal Czc from the outside (e.g., 180 in FIG. 1).

The zero-crossing prediction signal ZCPS and the control signal Czc may be input to input terminals of the AND gate 737, and an output signal of the AND gate 737 may be input to one of input terminals of the NOR gate 735. In some example embodiments, the control signal Czc may indicate that the image sensor described above with reference to FIG. 3 is operating during an A/D conversion interval. In this case, the zero-crossing prediction signal ZCPS affects an operation of the second counter 733 only when the image sensor operates during the A/D conversion interval, thereby preventing or hindering the second counter 733 from being enabled during intervals other than the A/D conversion interval.

Figure 17:
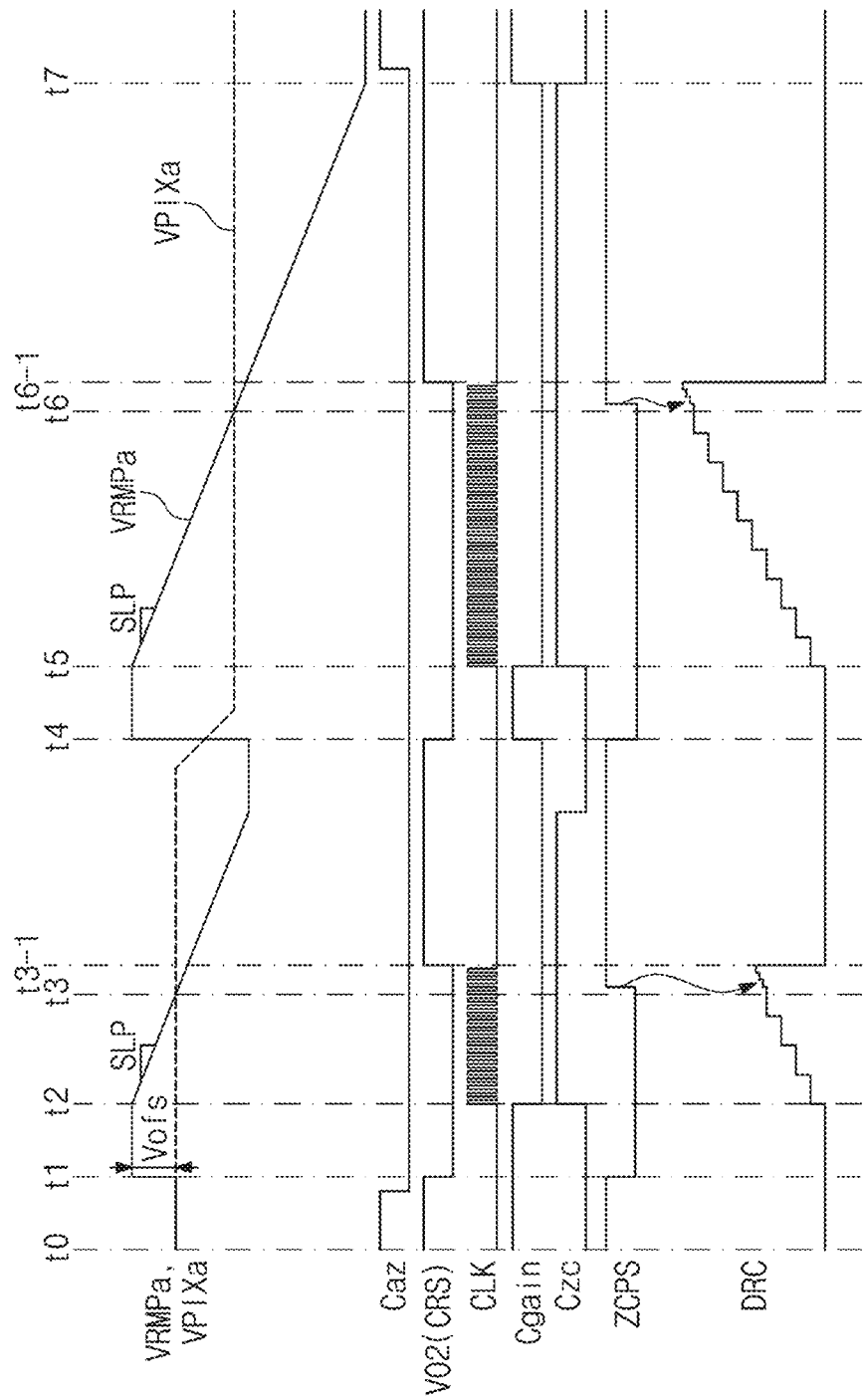
FIG. 17 is a timing diagram for describing an operation of an image sensor, according to some example embodiments of the present disclosure.

FIG. 17 is a timing diagram for describing an operation of an image sensor, according to some example embodiments of the present disclosure.

In FIG. 17 as time points t0, t1, t2, t3, t3-1, t4, t5, t6, t6-1, and t7 elapse, some of input/output signals of a comparison circuit (e.g., 130-1 of FIG. 1) and a counter circuit (e.g., 140-1 of FIG. 1), which are included in an image sensor (e.g., 10 in FIG. 1), are illustrated.

Referring to FIGS. 3 and 17, during an auto-zeroing interval (from t0 to t1), the control signal Caz may be activated to determine an operating point of each of (or at least one of) the amplification circuits included in the comparison circuit.

During a first offset interval (from t1 to t2), each of (or at least one of) the second output signal VO2(CRS) of the comparison circuit and the zero-crossing prediction signal ZCPS may be saturated with a ground voltage.

The counter circuit may include a first counter that outputs a high-order bit digital code, and a second counter that outputs a low-order bit digital code.

During the first A/D conversion interval (after t2), the first counter may be enabled in response to the voltage level of the ramp signal VRMPa being changed with a constant slope, and a second counter may be enabled in response to a voltage level of the zero-crossing prediction signal ZCPS being increased to be greater than or equal to a first predetermined (or alternatively, desired) voltage level. The first counter and the second counter may be disabled in response to the voltage level of the comparison result signal VO2 (CRS) being increased to be greater than or equal to a second predetermined (or alternatively, desired) voltage level.

While the first counter and the second counter are enabled, a clock signal CLK may be input to the counter circuit. During the A/D conversion interval, the control signals Cgain and Czc may be input to the comparison circuit.

During the second offset interval (from t4 to t5) and the second A/D conversion interval (after t5), the image sensor may operate in a similar method to the method during the first offset interval and the first A/D conversion interval.

Figure 18:
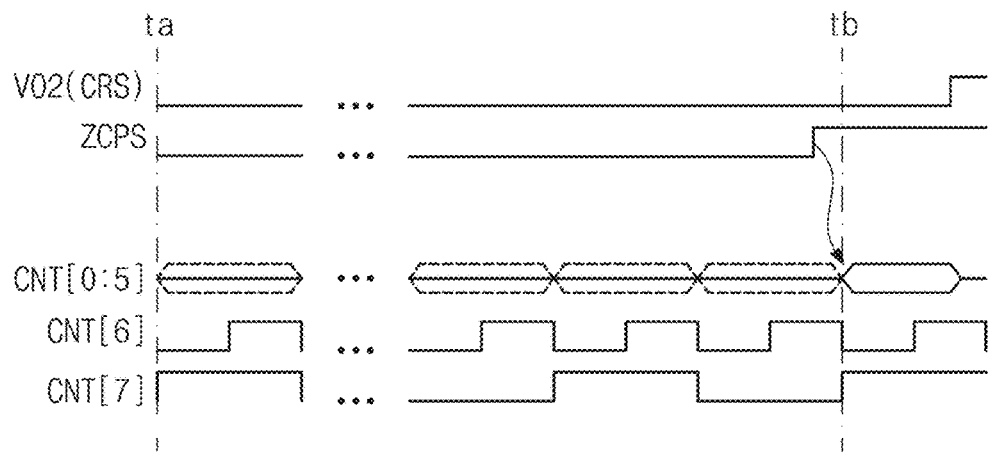
FIG. 18 is a timing diagram for describing an operation of a counter circuit, according to some example embodiments of the present disclosure.

FIG. 18 is a timing diagram for describing an operation of a counter circuit, according to some example embodiments of the present disclosure.

Referring to FIGS. 15 and 18, the first counter 731 may output a digital code CNT[6, 7] from a time point ta, and the second counter 733 may output a digital code CNT[0:5] from a time point tb.

In some example embodiments, during a first A/D conversion interval and a second A/D conversion interval described above with reference to FIG. 17, the time point ta may be a time point at which the voltage level of the ramp signal VRMPa is changed with a constant slope.

In some example embodiments, after a voltage level of the zero-crossing prediction signal ZCPS is increased to be greater than or equal to the first predetermined or desired voltage level, the time point tb may be a time point at which edges of clock signals input to the first counter 731 and the second counter 733 rise/fall.

In some example embodiments, the second counter 733 may output the digital code CNT[0:5] based on the zero-crossing prediction signal ZCPS from a time point that almost approaches a zero-crossing time point. Accordingly, it is possible to reduce unnecessary power consumption capable of occurring from a time point much earlier than the zero-crossing time point (e.g., ta) to a time point (e.g., tb) almost reaching the zero-crossing time point.

Figure 19:
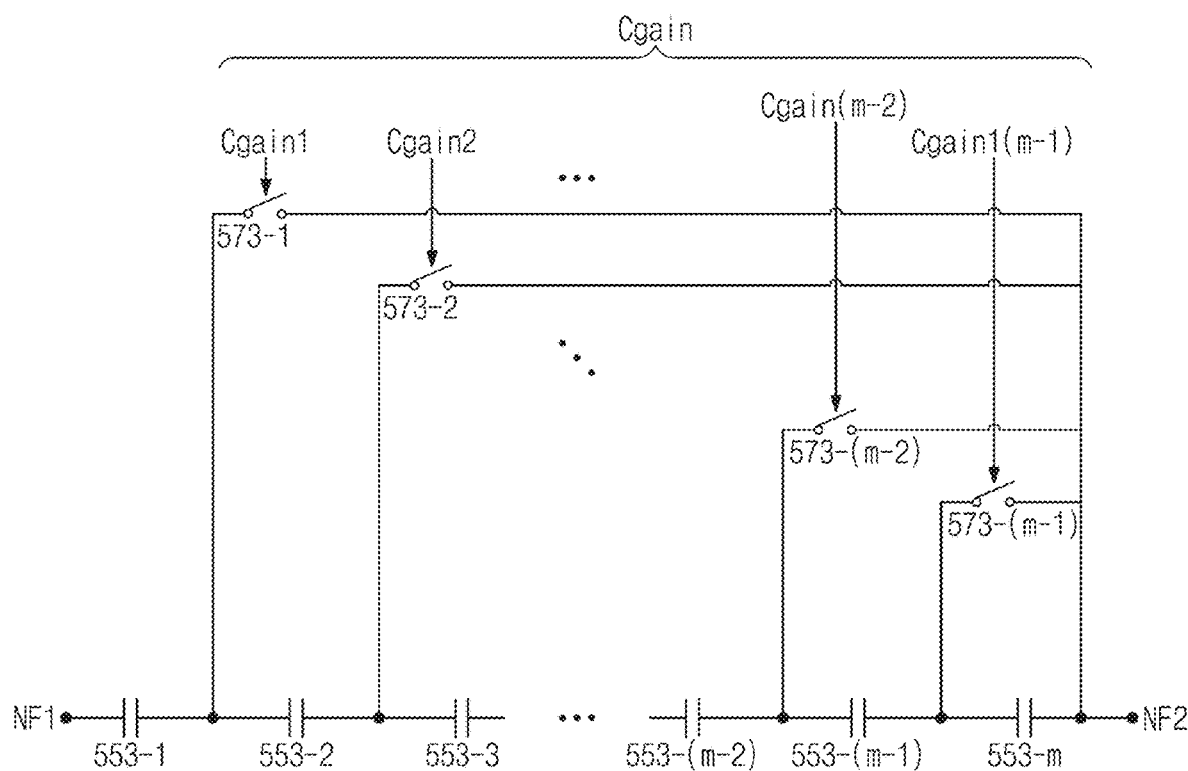
FIG. 19 is a circuit diagram illustrating an example embodiment of capacitors and switches included in the comparison circuit of FIG. 13.

FIG. 19 is a circuit diagram illustrating an example embodiment of capacitors and switches included in the comparison circuit of FIG. 13.

Referring to FIGS. 13 and 19, capacitors 553 and 555 and a switch 573 related to the capacitors 553 and 555 connected in series between the nodes NF1 and NF2 in FIG. 13 may be replaced by a plurality of capacitors 553-1, 553-2, 553-3, . . . , 553-(m–2), 553-(m–1), and 553-m shown in FIG. 19 and a plurality of switches 573-1, 573-2, . . . , 573-(m–2), and 573-(m–1) ('m' is an integer greater than or equal to 3).

The plurality of switches 573-1 to 573-(m–1) may be turned on/off based on control signals Cgain1, Cgain2, . . . , Cgain(m–2), and Cgain(m–1), and may adjust the magnitude of the combined capacitance of each of (or at least one of) the capacitors 553-1 to 553-m connected in series between the nodes NF1 and NF2.

In some example embodiments, the magnitude of the combined capacitance may be adjusted to be increased during an auto-zeroing interval and an offset interval among a plurality of time intervals during which the image sensor described above with reference to FIG. 3 operates. The magnitude of the combined capacitance may be adjusted to be decreased during the A/D conversion interval among the plurality of time intervals.

Figure 20:
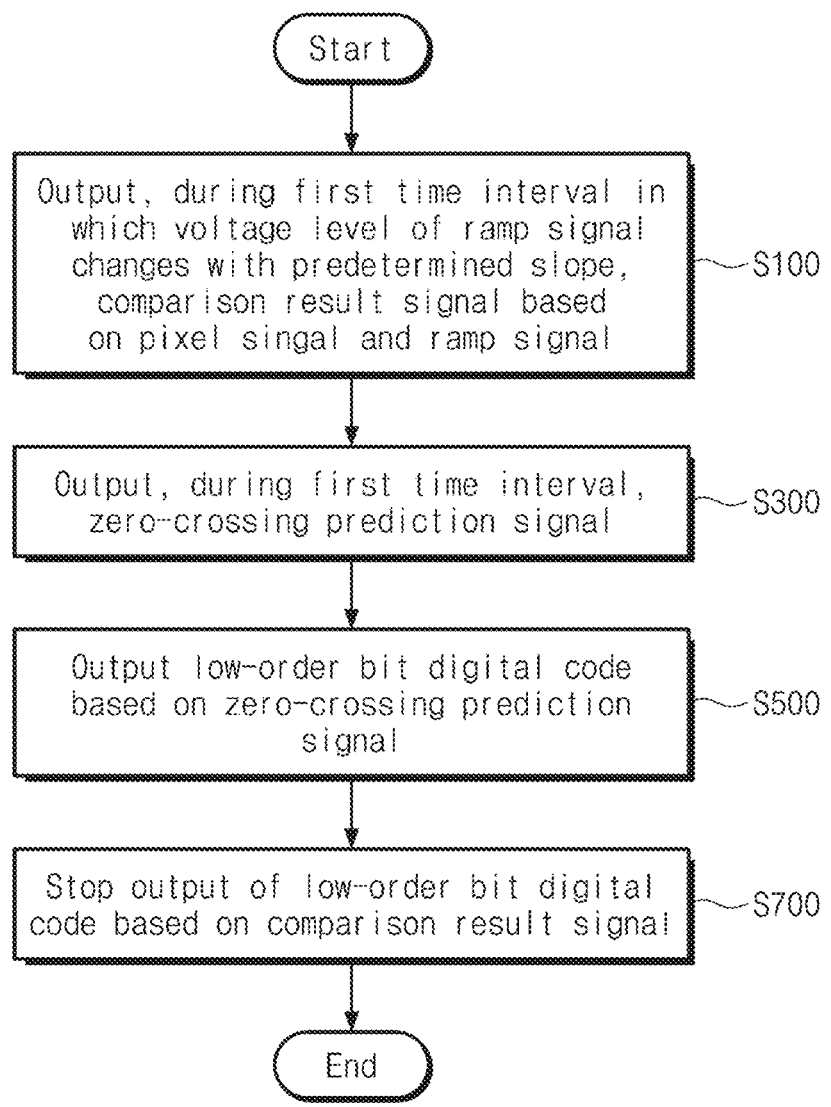
FIG. 20 is a flowchart illustrating a method of operating an image sensor, according to some example embodiments of the present disclosure.

FIG. 20 is a flowchart illustrating a method of operating an image sensor, according to some example embodiments of the present disclosure.

Referring to FIG. 20, in a method of operating an image sensor, a comparison result signal may be output based on a pixel signal and a ramp signal during a first time interval during which a voltage level of the ramp signal is changed with a constant slope (S100).

In some example embodiments, the ramp signal may be output from a ramp signal generator (e.g., 150 in FIG. 1), and the pixel signal may be output from a pixel array (e.g., 110 of FIG. 1) of an image sensor (e.g., 10 of FIG. 1).

During the first time interval, a zero-crossing prediction signal, which is transitioned before the zero-crossing time point at which the voltage level of the pixel signal becomes the same as the voltage level of the ramp signal may be output (S300).

In some example embodiments, the comparison result signal and the zero-crossing prediction signal may be generated by a comparison circuit (e.g., 130-1 of FIG. 1, 130-1 of FIG. 4, or the like).

A low-order bit digital code may be output based on a zero-crossing prediction signal (S500). The output of the low-order bit digital code may be stopped based on the comparison result signal (S700).

In some example embodiments, the low-order bit digital code may be generated by a first counter (e.g., 143 of FIG. 1).

As described above, according to some example embodiments of the present disclosure, an image sensor including a comparison circuit and an ADC may efficiently output a zero-crossing prediction signal by using only a zero-crossing prediction circuit without an additional ramp signal generator or additional comparison circuit while noise performance is not reduced.

Based on the zero-crossing prediction signal, the image sensor may output a low-order bit digital code from a point in time when a zero-crossing time point is almost reached. Accordingly, power efficiency may be improved by reducing unnecessary power consumption capable of occurring from a point much earlier than the zero-crossing time point to a point in time when the zero-crossing time point is almost reached.

The comparison circuit may include a first sub-circuit, and the image sensor may improve the noise performance of the image sensor by controlling (or adjusting) the bandwidth of the first sub-circuit, or may reduce the conversion error of the image sensor (in particular, an analog-digital converter or counter circuit) by reducing the swing range of the output signal of the first sub-circuit.

The above-mentioned description refers to example embodiments for implementing the scope of the present disclosure. Example embodiments in which a design is changed simply or which are easily changed may be included in the present disclosure as well as an example embodiment described above. In addition, technologies that are easily changed and implemented by using the above example embodiments may be included in the present disclosure. While the present disclosure has been described with reference to example embodiments thereof, it will be apparent to those of ordinary skill in the art that various changes and modifications may be made thereto without departing from the spirit and scope of the present disclosure as set forth in the following claims.

According to some example embodiments of the present disclosure, an image sensor including a comparison circuit and an ADC may efficiently output a zero-crossing prediction signal by using only a zero-crossing prediction circuit without an additional ramp signal generator or additional comparison circuit while noise performance is not reduced.

Based on the zero-crossing prediction signal, the image sensor may output a low-order bit digital code from a point in time when a zero-crossing time point is almost reached. Accordingly, power efficiency may be improved by reducing unnecessary power consumption capable of occurring from a point much earlier than the zero-crossing time point to a point in time when the zero-crossing time point is almost reached.

The comparison circuit may include a first sub-circuit, and the image sensor may improve the noise performance of the image sensor by controlling (or adjusting) the bandwidth of the first sub-circuit, or may reduce the conversion error of the image sensor (in particular, an analog-digital converter or counter circuit) by reducing the swing range of the output signal of the first sub-circuit.

Any of the elements and/or functional blocks disclosed above may include or be implemented in processing circuitry such as hardware including logic circuits; a hardware/software combination such as a processor executing software; or a combination thereof. For example, the control circuit 180 may be implemented as processing circuitry. The processing circuitry specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Processor(s), controller(s), and/or processing circuitry may be configured to perform actions or steps by being specifically programmed to perform those action or steps (such as with an FPGA or ASIC) or may be configured to perform actions or steps by executing instructions received from a memory, or a combination thereof.

While the present disclosure has been described with reference to example embodiments thereof, it will be apparent to those of ordinary skill in the art that various changes and modifications may be made thereto without departing from the spirit and scope of the present disclosure as set forth in the following claims.

What is claimed is:

1. An analog-to-digital converter (ADC) comprising:
   a comparison circuit configured to output a comparison result signal based on a pixel signal and a ramp signal and to output a zero-crossing prediction signal, the comparison circuit being configured to transition the zero-crossing prediction signal before a zero-crossing time point at which a voltage level of the pixel signal becomes identical to a voltage level of the ramp signal and during a time interval during which the voltage level of the ramp signal is changed; and
   a counter circuit configured to output a low-order bit digital code based on the zero-crossing prediction signal and to stop the output of the low-order bit digital code based on the comparison result signal.

2. The ADC of claim 1, wherein the comparison circuit includes
   a first amplification circuit configured to have a first voltage gain and to generate the comparison result signal, and a second amplification circuit configured to have a second voltage gain lower than the first voltage gain and to generate the zero-crossing prediction signal.

3. The ADC of claim 2, wherein the second amplification circuit is connected to a first node included in the first amplification circuit.

4. The ADC of claim 3, wherein the first amplification circuit includes
a first sub-circuit configured to output a first output signal through the first node by comparing the pixel signal with the ramp signal, and
a second sub-circuit configured to output a second output signal as the comparison result signal by amplifying the first output signal.

5. The ADC of claim 4, wherein the second amplification circuit includes
a first PMOS transistor and a first NMOS transistor, the first PMOS transistor and the first NMOS transistor being serially connected between a power supply voltage node and a ground voltage node,
a first capacitor connected between the first node and a gate node of the first NMOS transistor, and
a second capacitor connected between the gate node of the first NMOS transistor and a drain node of the first NMOS transistor.

6. The ADC of claim 5, wherein
the voltage level of the pixel signal becomes substantially identical to the voltage level of the ramp signal during a first time interval,
the voltage level of the ramp signal is increased by an offset voltage during a second time interval,
the voltage level of the ramp signal is decreased with a constant slope during a third time interval, and
the ADC is configured to determine a bias state of each of the first amplification circuit and the second amplification circuit during the first time interval.

7. The ADC of claim 6, wherein the second amplification circuit further includes a third capacitor connected between the first node and the drain node of the first NMOS transistor.

8. The ADC of claim 7, wherein
the second capacitor includes a first adjustment capacitor and a second adjustment capacitor,
the first adjustment capacitor and the second adjustment capacitor are serially connected with each other, and
the second amplification circuit further includes a gain adjustment switch connected between the drain node of the first NMOS transistor and a second node, the second node being positioned between the first adjustment capacitor and the second adjustment capacitor.

9. The ADC of claim 8, wherein the gain adjustment switch is configured to be turned on and turned off based on a gain adjustment control signal.

10. The ADC of claim 7, wherein
the first sub-circuit includes
a differential circuit configured to receive the pixel signal and the ramp signal,
a current mirror circuit connected between the differential circuit and the power supply voltage node, and
a bias circuit connected between the differential circuit and the ground voltage node,
the current mirror circuit includes
a third PMOS transistor connected between the power supply voltage node and a third node,
a fourth PMOS transistor connected between the third node and a fourth node, and
a fifth PMOS transistor connected between the power supply voltage node and the first node, and
a gate node of the third PMOS transistor is electrically connected to the fourth node and a gate node of the fourth PMOS transistor.

11. The ADC of claim 10, wherein a voltage level of a source voltage of the fourth PMOS transistor is determined as an overdrive voltage of the third PMOS transistor.

12. The ADC of claim 11, wherein
the counter circuit includes
a first counter configured to output a high-order bit digital code, and
a second counter configured to output the low-order bit digital code, and
the counter circuit enables the second counter based on the zero-crossing prediction signal and disables the second counter based on the comparison result signal.

13. The ADC of claim 12, wherein the counter circuit is configured to enable the first counter in response to the voltage level of the ramp signal being decreased with a constant slope, and enable the second counter in response to a voltage level of the zero-crossing prediction signal being increased to be greater than or equal to a first voltage level.

14. The ADC of claim 13, wherein
the first counter is configured to output the high-order bit digital code in response to the voltage level of the ramp signal being decreased with the constant slope, and is not configured to output the high-order bit digital code in response to a voltage level of the comparison result signal being increased to be greater than or equal to a second voltage level, and
the second counter is configured to output the low-order bit digital code in response to the voltage level of the zero-crossing prediction signal being increased to be greater than or equal to the second voltage level, and is not configured to output the low-order bit digital code in response to the voltage level of the comparison result signal being increased to be greater than or equal to the second voltage level.

15. A comparison circuit comprising:
a first sub-circuit configured to output a first output signal through a first node by comparing a pixel signal with a ramp signal;
a second sub-circuit configured to output a second output signal as a comparison result signal by amplifying the first output signal; and
a zero-crossing prediction circuit configured to output a zero-crossing prediction signal based on the first output signal, is the zero-crossing prediction circuit is configured to transition the zero-crossing prediction signal before a zero-crossing time point at which a voltage level of the pixel signal becomes identical to a voltage level of the ramp signal and during a time interval during which the voltage level of the ramp signal is changed.

16. The comparison circuit of claim 15, wherein
both the first sub-circuit and the second sub-circuit have a first voltage gain, and
the zero-crossing prediction circuit has a second voltage gain lower than the first voltage gain.

17. The comparison circuit of claim 15, wherein the zero-crossing prediction circuit includes
a first PMOS transistor and a first NMOS transistor, which are serially connected between a power supply voltage node and a ground voltage node,
a first capacitor connected between the first node and a gate node of the first NMOS transistor, and a second capacitor connected between the gate node of the first NMOS transistor and a drain node of the first NMOS transistor.

18. The comparison circuit of claim 17, wherein the zero-crossing prediction circuit further includes a third capacitor connected between the first node and the drain node of the first NMOS transistor.

19. The comparison circuit of claim 18, wherein
the second capacitor includes a first adjustment capacitor and a second adjustment capacitor,
the first adjustment capacitor and the second adjustment capacitor are serially connected with each other,
the zero-crossing prediction circuit further includes a gain adjustment switch connected between the drain node of the first NMOS transistor and a second node, the second node positioned between the first adjustment capacitor and the second adjustment capacitor, and
the gain adjustment switch configured to be turned on and turned off based on a gain adjustment control signal.

20. A comparison circuit comprising:
a pixel array configured to output a pixel signal;
a ramp signal generator configured to output a ramp signal;
a comparison circuit configured to output a comparison result signal based on the pixel signal and the ramp signal and to output a zero-crossing prediction signal, the comparison circuit is configured to transition the zero-crossing prediction signal before a zero-crossing time point at which a voltage level of the pixel signal becomes identical to a voltage level of the ramp signal and during a time interval during which the voltage level of the ramp signal is changed; and
a counter circuit configured to output a low-order bit digital code based on the zero-crossing prediction signal and to stop the output of the low-order bit digital code based on the comparison result signal,
wherein the comparison circuit includes
a first amplification circuit configured to have a first voltage gain and to generate the comparison result signal; and
a second amplification circuit connected to a first node included in the first amplification circuit and configured to have a second voltage gain lower than the first voltage gain and to generate the zero-crossing prediction signal.

* * * * *